US007296015B2

(12) United States Patent
Poltorak

(10) Patent No.: US 7,296,015 B2
(45) Date of Patent: Nov. 13, 2007

(54) APPARATUS AND METHOD FOR IDENTIFYING AND/OR FOR ANALYZING POTENTIAL PATENT INFRINGEMENT

(76) Inventor: Alexander I. Poltorak, 128 W. Maple Ave., Monsey, NY (US) 10952

( * ) Notice: Subject to any disclaimer, the term of this patent is extended or adjusted under 35 U.S.C. 154(b) by 778 days.

(21) Appl. No.: 10/367,228

(22) Filed: Feb. 14, 2003

(65) Prior Publication Data

US 2004/0078192 A1 Apr. 22, 2004

Related U.S. Application Data

(60) Provisional application No. 60/419,184, filed on Oct. 17, 2002.

(51) Int. Cl.
*G06F 17/30* (2006.01)
*G06F 7/00* (2006.01)
(52) U.S. Cl. .............................. 707/5; 704/9
(58) Field of Classification Search ............ 707/1–206; 704/1, 9
See application file for complete search history.

(56) References Cited

U.S. PATENT DOCUMENTS

| | | | | | |
|---|---|---|---|---|---|
| 5,623,679 | A | * | 4/1997 | Rivette et al. | 715/526 |
| 5,623,681 | A | * | 4/1997 | Rivette et al. | 715/522 |
| 5,696,963 | A | * | 12/1997 | Ahn | 707/5 |
| 5,721,763 | A | * | 2/1998 | Joseph et al. | 379/88.04 |
| 5,754,840 | A | * | 5/1998 | Rivette et al. | 707/2 |
| 5,799,325 | A | * | 8/1998 | Rivette et al. | 715/500 |
| 5,806,079 | A | * | 9/1998 | Rivette et al. | 715/512 |
| 5,809,318 | A | * | 9/1998 | Rivette et al. | 715/512 |
| 5,845,301 | A | * | 12/1998 | Rivette et al. | 715/512 |
| 5,848,409 | A | * | 12/1998 | Ahn | 707/3 |
| 5,982,931 | A | * | 11/1999 | Ishimaru | 382/218 |
| 6,038,561 | A | * | 3/2000 | Snyder et al. | 707/6 |
| 6,289,341 | B1 | * | 9/2001 | Barney | 707/6 |
| 6,401,118 | B1 | * | 6/2002 | Thomas | 709/224 |
| 6,560,590 | B1 | * | 5/2003 | Shwe et al. | 706/55 |
| 6,636,249 | B1 | * | 10/2003 | Rekimoto | 715/849 |
| 6,662,178 | B2 | * | 12/2003 | Lee | 707/3 |
| 6,665,656 | B1 | * | 12/2003 | Carter | 707/3 |
| 6,694,331 | B2 | * | 2/2004 | Lee | 707/104.1 |
| 6,845,486 | B2 | * | 1/2005 | Yamada et al. | 715/706 |
| 6,879,990 | B1 | * | 4/2005 | Boyer et al. | 707/205 |
| 7,047,255 | B2 | * | 5/2006 | Imaichi et al. | 707/104.1 |

(Continued)

OTHER PUBLICATIONS

Buckman, J. "Data Mining for the Soft Assets", Manning & Napier Investor Relations, Dec. 1996.*

(Continued)

*Primary Examiner*—Luke S Wassum

(57) ABSTRACT

An apparatus and method for identifying and/or analyzing potential patent infringement, including a processing device for processing the information regarding the patent, wherein the processing device identifies at least one independent claim of the patent, wherein the processing device formulates a search or a search query containing information corresponding to the at least one independent claim, wherein the processing device searches information regarding at least one of a product, products, a service, and services, wherein the processing device obtains and processes information regarding at least one of a product, products, a service, and services, relevant to the at least one independent claim in conjunction with information contained in the at least one independent claim, and further wherein the processing device generates claim chart information containing information regarding the at least one of a product, products, a service, and services.

88 Claims, 7 Drawing Sheets

U.S. PATENT DOCUMENTS

| | | | |
|---|---|---|---|
| 7,139,755 B2* | 11/2006 | Hammond | 707/5 |
| 2002/0138297 A1* | 9/2002 | Lee | 705/1 |
| 2002/0138474 A1* | 9/2002 | Lee | 707/3 |
| 2002/0147738 A1* | 10/2002 | Reader | 707/500 |
| 2003/0088581 A1* | 5/2003 | Maze et al. | 707/104.1 |
| 2003/0187832 A1* | 10/2003 | Reader | 707/3 |
| 2004/0078365 A1* | 4/2004 | Poltorak | 707/3 |
| 2004/0088332 A1* | 5/2004 | Lee et al. | 707/200 |
| 2004/0133562 A1* | 7/2004 | Toong et al. | 707/3 |
| 2004/0158559 A1* | 8/2004 | Poltorak | 707/3 |
| 2004/0243566 A1* | 12/2004 | Ogram | 707/3 |
| 2004/0261011 A1* | 12/2004 | Stuckman et al. | 715/507 |
| 2005/0071367 A1* | 3/2005 | He et al. | 707/102 |
| 2006/0026146 A1* | 2/2006 | Tvito | 707/3 |

OTHER PUBLICATIONS

Calistri-Yeh, R. and B. Yuan "The MAPIT Patent-TSV System", Advanced Technology Group, Manning & Napier Information Services, Version 2.7, Jan. 11, 2000.*

Feldman, S. "Manning & Napier Information Services Announces CINDOR, a Multi-Language Search-and-Retrieval System", Information Today, vol. 17, No. 2, p. 42, Feb. 2000.*

Poltorak, A.I. and P.J. Lerner "Introducing Litigation Risk Analysis", Managing Intellectual Property, Issue 109, May 2001.*

PR Newswire "Aurigin and ClearForest Partner to Significantly Increase Search and Analysis Capabilities for Critical Patent Research", press release, Oct. 15, 2001.*

ClearForest Corp. "ClearForest Announces ClearTags 4.0 for Comprehensive Content Auto-Tagging", press release, Mar. 5, 2002.*

ArnoldIT "ClearForest: Cutting through Content Clutter", downloaded from www.arnoldit.com/articles/clearforest.pdf, Sep. 7, 2003.*

Robb, D. "Text Mining Tools take on Unstructured Data", Computerworld, Jun. 21, 2004.*

Lau, K-N, K-H Lee, Y. Ho and P-Y Lan "Mining the Web for Business Intelligence: Homepage Analysis in the Internet Era", Database Marketing & Customer Strategy Management, vol. 12, No. 1, pp. 32-54, Apr. 19, 2004.*

Poltorak, A.I. "Industrywide Patent Enforcement Strategies", Law Journal Newsletters, Patent Strategy & Management, Oct. 2005 and Nov. 2005 (Pts I & II).*

Ben-Dov, M., W. Wu, R. Feldman and P.A. Cairns "Improving Knowledge Discovery by Combining Text-Mining and Link-Analysis Techniques", undated, downloaded from www.uclic.ucl.ac.uk/paul/research/Moty1.pdf, Jun. 14, 2006.*

Penn Printout "Vendor White Pages", vol. 11, No. 1, downloaded from www.upenn.edu, Sep. 1994.*

Ruiz, M., A. Diekema and P. Sheridan "CINDOR Conceptual Interlingua Document Retrieval: TREC-8 Evaluation", NIST Special Publication 500-246, Nov. 17-19, 1999, pp. 597-606.*

MSDN "MSDN Online Chats", downloaded from msdn.microsoft.com/chats, Aug. 9, 2000.*

CNET "Welcome to CNET!", downloaded from www.cnet.com, Mar. 1, 2001.*

Ballesteros, L. and W.B. Croft "Phrasal Translation and Query Expansion Techniques for Cross-Language Information Retrieval", Proceedings of the 20th Annual International ACM SIGIR Conference on Research and Development in Information Retrieval, 1997, pp. 84-91.*

* cited by examiner

APPARATUS AND METHOD FOR IDENTIFYING AND/OR FOR ANALYZING POTENTIAL PATENT INFRINGEMENT

REFERENCE TO RELATED APPLICATION

This application claims priority benefit of provisional U.S. patent application Ser. No. 60/419,184, entitled APPARATUS AND METHOD FOR IDENTIFYING AND/OR FOR ANALYZING POTENTIAL PATENT INFRINGEMENT, filed 17 Oct. 2002, which application is hereby incorporated by reference.

FIELD OF THE INVENTION

The present invention pertains to an apparatus and a method for identifying and/or for analyzing potential patent infringement and, in particular, to an apparatus and a method for determining and/or for providing information regarding whether or not a patent infringement may exist.

BACKGROUND OF THE INVENTION

A patent owner enjoys a right to a limited monopoly regarding the intellectual property rights granted by a patent. It is important to note, however, that once a patent is granted, the patent owner is responsible for taking the affirmative steps needed to enforce his, her, or its, patent rights.

Patent enforcement activities can include identifying an alleged infringing product or service, performing an infringement analysis, which can typically include determining the meaning or definition of a patent claim and/or defining a product(s) and/or service(s) to which a patent claim is directed, identifying a product(s) and/or service(s) which meets, or which would appear to meet the elements and/or limitations of the patent claim, either literally and/or under the Doctrine of Equivalents, and, thereafter, determining whether an infringement of the patent claim exists.

The above-described process can involve a great deal of effort on the part of the patent owner and a great of legal expertise, which can be very costly.

In a first instance, a patent owner must identify and/or locate a product(s) and/or a service(s) which may fall within the scope of a patent claim. In a global economy which provides new products and services on an on-going basis, the patent owner faces an ever changing product and/or service environment. In such an environment, the patent owner may not always be able to, or be capable of, effectively policing and/or monitoring available products and/or services which may be infringing his, her, or its, patent.

In a second instance, once a potentially infringing product and/or service is identified, information regarding same may not always be readily available for allowing one to perform a complete and adequate infringement analysis to determine if the product and/or service does, in fact, infringe a patent claim.

In view of the foregoing, it is easy to understand that the efforts expended in policing products and/or services for patent infringement and/or in performing patent infringement studies and/or evaluations can involve a great deal of time, effort and expense, which may prevent a patent owner from effectively and efficiently enforcing his, her, or its, patent rights. This, in turn, can prevent a patent owner from realizing optimal returns from a patent. There appears to be no apparatus, system, and/or method, which can be utilized in order to effectively and efficiently assist a patent owner in policing for, and identifying, instances of patent infringement.

SUMMARY OF THE INVENTION

The present invention pertains to an apparatus and a method for identifying and/or for analyzing potential patent infringement which overcomes the shortfalls of the prior art. The present invention also provides an apparatus and a method for determining and/or for providing information regarding whether or not a patent infringement may exist.

The present invention also provides an apparatus and a method which can be utilized in order to police for and/or to discover and/or analyze a potential infringement of a patent. The present invention can also be utilized to identify an independent claim of a patent and/or the independent claims of a patent. The present invention can also be utilized in order to parse the subject matter of an independent claim in order to identify preamble subject matter as well as claim element(s) subject matter and/or claim limitation(s) subject matter.

The present invention can also be utilized in order to identify a product and/or a service covered by a patent and/or by an independent patent claim. The present invention can also be utilized in order to identify one or more elements and/or limitations of a patent claim.

The present invention can also be utilized in order to formulate and/or construct a search and/or a search query for use in searching for a product(s) and/or a service(s) which may be infringing a patent. The search and/or search query can then be utilized in order to search a database, databases, and/or other information sources, in order to ascertain and/or to identify a product(s) and/or a service(s), or information which may be of interest in searching for such a product(s) and/or a service(s), which may be infringing any claim or claims of a patent.

The present invention can also be utilized in order to parse the subject matter relating to any identified product(s) and/or service(s), and to identify any subject matter relating to and/or corresponding to the information regarding claim preamble information and/or information regarding any claim element(s) and/or any claim limitation(s).

The present invention can also be utilized in order to generate a claim chart(s) report containing claim chart information regarding any of the identified product(s) or service(s) and how the respective information corresponds to the preamble and/or elements and/or limitations of a respective independent claim. The information contained in the claim chart report can be utilized in conducting a patent infringement evaluation or study.

The present invention can be utilized in a stand-alone environment wherein all of the information utilized in performing the method of the present invention can be stored at and/or can be provided at the apparatus of the present invention. The present invention can also be utilized in a network environment wherein the apparatus of the present invention can be utilized in conjunction with other computers and/or information sources which can be linked with the apparatus in the network environment.

The apparatus of the present invention can include a processing computer which can perform any and/or all of the processing routines described herein as being performed by the present invention. The processing computer can be any computer or computer system. The processing computer can also be comprised of a plurality of computers and/or computer systems. The processing computer can also be a personal computer, a desktop computer, a laptop or notebook computer, a central processing computer, a server computer, and/or any other suitable computer, computer system, and/or processing device or system.

The apparatus can also include any number of information source computers which can be any computer or computer system which stores and/or provides information which can be utilized in order to perform any of the processing routines and/or functionality described herein as being provided by the present invention.

The information source computer can include a database or memory storage device which can contain any data and/or information which can be utilized by the processing computer.

An information source computer can be associated with, and/or can store and/or provide data and/or information regarding, any one or more of a number of information sources. The information sources can include information regarding any one or more of product information for any number of products and/or for any variety of products. The product information can include product descriptions, descriptions of components, descriptions of product uses, subject matter of patents which cover a product or products, and any other information which can be utilized in performing the processing routines and/or functionality of the present invention.

The information sources can also include information regarding services for any number of services and/or for any variety of services. The services information can include service descriptions, descriptions of processes, descriptions of service uses, subject matter of patents which cover a service or services, and any other information which can be utilized in performing the processing routines and/or functionality of the present invention.

The information sources can also include data and/or information contained in any number or types of product catalogs, services catalogs, industry atlases, trade journals, technical journals, product manuals, service manuals, services manuals, industry journals, books, magazines, and/or other publications, Dialog databases, NERAK databases, Thomas Register databases, Derwent databases, and/or any other informational database or databases.

The information sources can also include software programs and/or algorithms for performing searches having any predefined and/or pre-selected accuracy or integrity constraints or definitions assigned and/or corresponding thereto.

The information sources can also include patent databases containing information regarding any number of types or kinds of patents for any number of countries and/or national and/or regional patent offices. The information sources can also include software programs and/or algorithms for analyzing any of the herein-described product information, services information, and/or patent information, in conjunction with patent claim information.

The information sources can also include software programs and/or algorithms for generating and/or creating claim charts for claims and/or claim preambles, claim elements and/or claim limitations. The information sources can also contain software programs and/or algorithms for generating claim charts and/or related reports and/or information.

The information sources can also include information contained on web sites, in product catalogs, in service catalogs, in product descriptions, in services descriptions, in product reviews, in services reviews, industry review materials, in advertising materials and/or literature, in marketing materials and/or literature, and/or any other related information, associated with and/or regarding any respective manufacturers, services providers, wholesalers, and/or retailers, who or which may respectively manufacture, provide, sell, use, offer to sell, advertise, and/or otherwise engage in activities regarding products or services which may the subject of an infringement analysis or review, and/or any other information found in product atlases, services atlases, industry databases, and/or other information sources.

The information source computers can also be any server computer, web site server computer, database storage computer, informational database computer, and/or central processing computer, patent office patent database computer(s) for any number of national patent offices and/or any number of regional patent offices, a search engine, a meta search engine, a computer which utilizes and/or deploys intelligent agents, a directory computer, a product index computer, a services index computer, and/or a hierarchical directory computer.

The processing computer can transmit signals and/or information to, and receive signals and/or information from, any one or more of the information source computers via any suitable communication network or system, including, but not limited to, a telecommunication network, the Internet, the World Wide Web, an RF signal communications network, a satellite communications network, an optical communications network, a public switched telephone network, a digital communications network, a personal communications services (PCS) communication network, a wireless communication network, and/or any other communication network or system, and/or any combination of same.

The processing computer can include a central processing unit (CPU) which can perform any and all of the processing routines and/or functionality described herein as being provided by the apparatus the present invention. The processing computer can also include a read only memory device(s) (ROM) and a random access memory device(s) (RAM), each of which is connected to the central processing unit.

The processing computer can also include a user input device, for entering data and/or commands into the processing computer and which can include any one or more of a keyboard, a scanner, a user pointing device, such as, for example, a mouse, and/or a touch pad, which input device(s) are also connected to the central processing unit. The processing computer can also include a display device for displaying data and/or information to a user. The processing computer can also include an output device, such as a printer or other output device for providing data and/or information to the user.

The processing computer can also include a database(s) which can contain any and/or all of the herein-described data and/or information which may be needed and/or desired in performing any of the processing routines and/or search routines described herein as being performed by the present invention.

The database can also contain any one or more of software programs and/or algorithms for performing any and/or all of the processing routines described herein as being performed by the present invention.

The processing computer can also include a receiver for receiving data and/or information, including any of the herein-described data and/or information, and/or any of the other data and/or information described herein as being provided to the processing computer from any one or more of the information source computers. The receiver can also receive an information request or requests from another computer or communication device.

The processing computer can also include a transmitter for transmitting data and/or information, and/or a request for data and/or information, to any one or more of the information source computer(s). The transmitter can also transmit data and/or information to a computer or communication device which may be utilized in conjunction with the present invention.

The present invention can be utilized in order to identify and/or to police for instances of patent infringement. The present invention can also be utilized in order to analyze information regarding potential patent infringement and/or instances of potential patent infringement.

The present invention can also be utilized in order to process and/or parse patent information in order to identify independent claims of a patent. The present invention can identify and store an independent claim or independent claims of a patent.

The present invention can also process and/or parse information contained in each independent claim in order to identify the preamble of the claim. The present invention can also process and/or parse information contained in each independent claim in order to identify claim elements and/or claim limitations. The present invention can utilize any one or more of artificial intelligence processing techniques, text analysis processing techniques, and/or semantic analysis processing techniques.

The present invention can also be utilized in order to identify a product and/or a service to which a patent claim or patent claims are directed. The present invention can also identify a key word(s), term(s), and/or concept(s), for a claim element(s) and/or a claim limitation(s) in order to identify a product and/or service to which a patent claim is directed. The present invention can also be utilized in order to assign a key word(s), term(s), or category information, to an identified product and/or service to which a patent claim is directed.

The present invention can also be utilized in order to identify a key word(s), term(s), and/or category information, for any number of claim elements and/or claim limitations of a patent claim or patent claims.

The present invention can also be utilized in order to formulate or construct a search or the search query which can contain any of the information described herein as being identified and/or utilized in order to describe the product and/or service to which a patent claim is directed and/or any of the information described herein which is identified and/or utilized in order to describe any of the claim elements and/or claim limitations of the patent claim. The search or search query can contain synonyms for any of the key words, terms, and/or category information, which are utilized in the search or search query.

The present invention can also be utilized in order to perform a search of information and/or database information regarding products and/or services by utilizing the key words, terms, and/or information, contained in the search or search query in order to attempt to identify products and/or services which may be a potential infringement of a patent claim. The present invention can identify a product(s) and/or a service(s) by searching information regarding products and/or services for the presence of any of the key words, terms, and/or information, contained in the search or search query.

The present invention can identify a product(s) and/or a service(s) which may be infringing the patent claim. The present invention can also be utilized to generate and/or create a claim chart, claim chart information, and/or a claim chart report, which can contain information regarding the identified product(s) and/or service(s) as it may relate to the claim preamble and/or any of the claim elements and/or claim limitations.

The present invention can also be utilized so as to highlight, underline, embolden, and/or otherwise call attention to key words, terms, and/or information, regarding the product(s) and/or service(s) which match any of the key words, terms, and/or information, in the search or search query.

The information contained in a claim chart, claim chart information, and/or claim chart report, can be utilized in order to perform a patent infringement study and/or analysis.

The processing computer can perform a search regarding the independent claim by searching any of the herein-described information stored in the database and/or in any of the information source computers.

The central processing computer can also perform a "standalone" search wherein the processing computer searches information contained in its database. The processing computer can also perform a search involving the information contained in the database and any information stored in any information source computer or information source computers. The processing computer can perform a search involving and/or including any number of databases and/or information-sources.

A user can also pre-define and/or pre-select criteria regarding an accuracy or an integrity of a search. Search results can also include results wherein key words, terms, and/or information, of the search and/or search query can be found in a same sentence, in a same description, and/or within a pre-defined proximity to other key words, terms, and/or information.

The processing computer can also search and/or analyze web page content and/or web site content for any product(s) and/or service(s) which are, or which may be, the same as, an equivalent of, similar to, and/or analogous to, the product(s) and/or service(s) to which an independent claim is directed. The processing computer can also search and/or analyze the content of a web page or web pages and/or a web site or web sites in order to locate, identify, and process, information and/or descriptions regarding a product, products, a service, and/or services.

The processing computer can also utilize various searching tools, programs, intelligent agents, search engines, search engines such as Web Ferret, Google, etc., web site directories, search engine directories, hierarchical directories, and/or other techniques, in order to search any number of sites on the Internet and/or the World Wide Web.

The processing computer can also search web sites associated with a product, products, a service, services, trade associations, technical associations, industry associations, and/or manufacturers, wholesalers, and/or retailers, of any product, products, service, and/or services. The processing computer can also search advertising literature and materials stored in databases and/or on web sites, marketing literature and/or materials stored in databases and/or on web sites, articles, literature, and/or materials, which review products and/or services, and/or any manufacturer and/or distributor literature and/or materials regarding products and/or services.

The processing computer can also perform searches of on-line catalogs and/or marketing sites. The processing computer can also be utilized in order to communicate with, and/or to participate in, chat room discussions and on-line bulletin boards. The processing computer can generate natural language questions or queries and transmit same to a chat room or bulletin board and await and receive any responses thereto.

Any and/or all of the searches and/or search queries and/or any of the message(s) generated by the processing computer during its search routine or search routines can be in any language and/or in any number of languages. In this manner, the present invention can operate in any language and/or in a language independent manner.

The processing computer can also search patents or other publications which may reference the patent in question. The processing computer can also ascertain and/or determine an inventor(s) and/or an assignee of a patent(s) and/or any contact information and/or web site information corresponding thereto and/or an author(s) or publisher(s) of a publication(s) and/or any contact information and/or web site information corresponding thereto.

The processing computer can perform a claim chart analysis and generate a claim chart report containing claim chart information for the independent claim. The claim chart information can provide the text of the claim preamble and the text for the claim elements and/or claim limitations. The claim chart can include, for the claim preamble and for each of the claim elements and/or claim limitations, information regarding whether an identified product or service exhibits the features and/or limitations of the claim preamble and any of the claim elements and/or claim limitations, either literally and/or under the Doctrine of Equivalents.

The processing computer can generate a claim chart report containing claim chart information for each product and/or service identified in the search. The processing computer can also generate claim chart information for the independent claim illustrating whether and how an identified product and/or service may be infringement of the independent claim. Descriptive words, elements and/or features of the identified product and/or service can be inserted verbatim and/or in context into the claim chart. Any words, terms, and/or information, which match the keywords, terms, and/or information, in the claim text can also be highlighted, underlined, and/or emboldened, in order to call attention to the match.

The processing computer can be utilized to perform an infringement analysis for any number of, and/or all of, the independent claims of a patent.

The processing computer can also display the claim chart information via the display device and/or output the Claim chart information via the output device.

The present invention can also be programmed to automatically perform any and/or all of the processing routines and/or functionality described herein.

The present invention can also be utilized in order to provide any of the herein-described processing routines and/or functionality to a user computer or communication device in a network or on-line environment.

Accordingly, it is an object of the present invention to provide an apparatus and a method for identifying and/or for analyzing potential patent infringement.

It is another object of the present invention to provide an apparatus and a method for determining and/or for providing information regarding whether or not an infringement of a patent may exist.

It is still another object of the present invention to provide an apparatus and a method which can be utilized in order to search for and/or to discover and/or analyze a potential infringement of a patent.

It is yet another object of the present invention to provide an apparatus and a method for identifying and/or for analyzing potential patent infringement which can be utilized to identify an independent claim of a patent and/or the independent claims of a patent.

It is another object of the present invention to provide an apparatus and a method for identifying and/or for analyzing potential patent infringement which can be utilized to parse the subject matter of an independent claim in order to identify claim limitations in the preamble.

It is still another object of the present invention to provide an apparatus and a method for identifying and/or for analyzing potential patent infringement which can be utilized to parse the subject matter of an independent claim in order to identify claim element(s) and/or a claim limitation(s).

It is yet another object of the present invention to provide an apparatus and a method for identifying and/or for analyzing potential patent infringement which can be utilized in order to identify a product and/or a service covered by a patent.

It is another object of the present invention to provide an apparatus and a method for identifying and/or for analyzing potential patent infringement which can be utilized in order to identify a product and/or a service covered by an independent claim of a patent.

It is still another object of the present invention to provide an apparatus and a method for identifying and/or for analyzing potential patent infringement which can be utilized in order to identify one or more elements and/or limitations of a patent claim.

It is yet another object of the present invention to provide an apparatus and a method for identifying and/or for analyzing potential patent infringement which can be utilized in order to formulate and/or construct a search and/or a search query for conducting a search for a product(s) and/or service(s) which may be infringing a patent claim.

It is another object of the present invention to provide an apparatus and a method for identifying and/or for analyzing potential patent infringement which can be utilized in order to search a database, databases, and/or other information sources, in order to ascertain and/or to identify a product(s) and/or a service(s), or other information which may be of interest in searching for a product(s) and/or a service(s), which may be infringing any claim or claims of a patent.

It is still another object of the present invention to provide an apparatus and a method for identifying and/or for analyzing potential patent infringement which can be utilized in order to parse the claim language relating to any identified product(s) and/or service(s), and/or to identify any subject matter relating to and/or corresponding to the information regarding claim preamble information and/or information regarding any claim element(s) and/or a claim limitation(s).

It is yet another object of the present invention to provide an apparatus and a method for identifying and/or for analyzing potential patent infringement which can be utilized in order to generate claim chart information for a patent claim.

It is another object of the present invention to provide an apparatus and a method for identifying and/or for analyzing potential patent infringement which can be utilized in order to generate a claim chart(s) report for a patent claim.

It is still another object of the present invention to provide an apparatus and a method for identifying and/or for analyzing potential patent infringement which can be utilized in order to generate a claim chart(s) containing any information regarding any of the identified product(s) and/or service(s) and how the respective information corresponds to the claim preamble and/or claim elements and/or claim limitations of a patent claim.

It is yet another object of the present invention to provide an apparatus and a method for identifying and/or for analyzing potential patent infringement which can be utilized in order to generate a claim chart(s) containing any information which can be utilized in conducting a patent infringement evaluation or study.

It is another object of the present invention to provide an apparatus and a method for identifying and/or for analyzing potential patent infringement which can be utilized in a stand-alone environment.

It is still another object of the present invention to provide an apparatus and a method for identifying and/or for analyzing potential patent infringement which can be utilized in a network environment and/or in an on-line environment.

It is yet another object of the present invention to provide an apparatus and a method for identifying and/or for analyzing potential patent infringement which can be utilized in conjunction with one or more information source computers.

It is another object of the present invention to provide an apparatus and a method for identifying and/or for analyzing potential patent infringement which can be utilized in conjunction with any suitable communication network or system.

It is still another object of the present invention to provide an apparatus and a method for identifying and/or for analyzing potential patent infringement which can be utilized in conjunction with any suitable communication network or system, including, but not limited to, a telecommunication network, the Internet, the World Wide Web, an RF signal communications network, a satellite communications network, an optical communications network, a public switched telephone network, a digital communications network, a personal communications services (PCS) communication network, a wireless communication network, and/or any other communication network or system, and/or any combination of same.

It is yet another object of the present invention to provide an apparatus and a method for identifying and/or for analyzing potential patent infringement which can be utilized in order to identify and/or to store independent claim information.

It is another object of the present invention to provide an apparatus and a method for identifying and/or for analyzing potential patent infringement which can be utilized in order to identify and/or to store independent claim preamble text information.

It is still another object of the present invention to provide an apparatus and a method for identifying and/or for analyzing potential patent infringement which can be utilized in order to identify and/or to store text information for a claim element(s) and/or a claim limitation(s).

It is yet another object of the present invention to provide an apparatus and a method for identifying and/or for analyzing potential patent infringement which can be utilized in order to process and/or to parse information contained in each independent claim in order to identify text information pertaining to a claim element(s) and/or a claim limitation(s).

It is another object of the present invention to provide an apparatus and a method for identifying and/or for analyzing potential patent infringement which can utilize any one or more of artificial intelligence processing techniques, text analysis processing techniques, and/or semantic analysis processing techniques.

It is still another object of the present invention to provide an apparatus and a method for identifying and/or for analyzing potential patent infringement which can be utilized in order to identify a product and/or a service to which a patent claim is directed.

It is another object of the present invention to provide an apparatus and a method for identifying and/or for analyzing potential patent infringement which can be utilized in order to identify a key word(s), term(s), and/or concept(s), in order to identify or describe a product(s) and/or a service(s) to which a patent claim is directed.

It is another object of the present invention to provide an apparatus and a method for identifying and/or for analyzing potential patent infringement which can be utilized in order to assign a key word(s), term(s), and/or concept(s), to a product(s) and/or a service(s) to which a patent claim is directed.

It is still another object of the present invention to provide an apparatus and a method for identifying and/or for analyzing potential patent infringement which can be utilized in order to identify a key word(s), term(s), and/or concept(s), for a claim element(s) and/or a claim limitation(s) of a patent claim.

It is yet another object of the present invention to provide an apparatus and a method for identifying and/or for analyzing potential patent infringement which can be utilized in order to assign a key word(s), term(s), and/or concept(s), to a claim element(s) and/or a claim limitation(s) of a patent claim.

It is another object of the present invention to provide an apparatus and a method for identifying and/or for analyzing potential patent infringement which can be utilized in order to formulate and/or construct a search or search query containing information utilized to describe a product(s) and/or service(s) to which a patent claim is directed.

It is still another object of the present invention to provide an apparatus and a method for identifying and/or for analyzing potential patent infringement which can be utilized in order to formulate and/or construct a search or search query containing information utilized to describe a claim element(s) and/or a claim limitation(s) of a patent claim.

It is yet another object of the present invention to provide an apparatus and a method for identifying and/or for analyzing potential patent infringement which can be utilized in order to formulate and/or construct a search or search query containing a synonym or synonyms for any key word(s), term(s), and/or information, utilized in formulating or constructing a search or a search query.

It is another object of the present invention to provide an apparatus and a method for identifying and/or for analyzing potential patent infringement which can be utilized in order to perform a search of information and/or database information containing information on products and/or services.

It is still another object of the present invention to provide an apparatus and a method for identifying and/or for analyzing potential patent infringement which can be utilized in order to perform a search of information and/or database information containing information on products and/or services, which may be a potential infringement of a patent claim, by utilizing key word(s), term(s), and/or information, contained in a search or search query.

It is yet another object of the present invention to provide an apparatus and a method for identifying and/or for analyzing potential patent infringement which can be utilized in order to identify a product(s) and/or a service(s) which may be infringing a patent claim.

It is another object of the present invention to provide an apparatus and a method for identifying and/or for analyzing potential patent infringement which can be utilized in order to identify a product(s) and/or a service(s), which may be infringing a patent claim, by searching information regarding products and/or services for the presence of a key word(s), term(s), and/or information, contained in a search or a search query.

It is still another object of the present invention to provide an apparatus and a method for identifying and/or for analyzing potential patent infringement which can be utilized in order to generate and/or create a claim chart, claim chart information, and/or a claim chart report, regarding an identified product(s) and/or service(s) as such may relate to any of the claim preamble information and/or information regarding any of the claim elements and/or claim limitations.

It is yet another object of the present invention to provide an apparatus and a method for identifying and/or for analyzing potential patent infringement which can be utilized in order to generate and/or create a claim chart, claim chart information, and/or a claim chart report, which contains highlighted, underlined, and/or emboldened, key words, terms, and/or information, which match any key word(s), term(s), and/or information, in a search or a search query.

It is another object of the present invention to provide an apparatus and a method for identifying and/or for analyzing potential patent infringement which can be utilized in order to display, output, and/or provide, claim chart information which can be utilized in order to perform a patent infringement study and/or analysis.

It is still another object of the present invention to provide an apparatus and a method for identifying and/or for analyzing potential patent infringement in which a user can pre-define and/or pre-select criteria regarding an accuracy or an integrity of a search.

It is yet another object of the present invention to provide an apparatus and a method for identifying and/or for analyzing potential patent infringement which can be utilized in order to search and/or analyze web page content and/or web site content in order to locate, identify, and/or process information regarding any product(s) and/or service(s) which may the same as, an equivalent of, similar to, and/or analogous to, a product(s) and/or a service(s) to which an independent claim is directed.

It is another object of the present invention to provide an apparatus and a method for identifying and/or for analyzing potential patent infringement which can utilize various searching tools, programs, intelligent agents, and/or search engines, to search any number of sites on the Internet and/or the World Wide Web.

It is still another object of the present invention to provide an apparatus and a method for identifying and/or for analyzing potential patent infringement which can be utilized in order to search web sites associated with a product, products, a service, and/or services, trade associations, technical associations, industry associations, and/or manufacturers, wholesalers, and/or retailers, of any product, products, service, and/or services.

It is yet another object of the present invention to provide an apparatus and a method for identifying and/or for analyzing potential patent infringement which can be utilized in order to search advertising literature and/or materials stored in databases and/or on web sites, marketing literature and/or materials stored in databases and/or on web sites, articles, literature, and/or materials, which review products and/or services, and/or any manufacturer and/or distributor literature and/or materials regarding products and/or services.

It is another object of the present invention to provide an apparatus and a method for identifying and/or for analyzing potential patent infringement which can be utilized in order to search on-line catalogs and/or marketing sites.

It is still another object of the present invention to provide an apparatus and a method for identifying and/or for analyzing potential patent infringement which can be utilized in order to communicate with, and/or participate in, chat room discussions and/or on-line bulletin boards.

It is yet another object of the present invention to provide an apparatus and a method for identifying and/or for analyzing potential patent infringement which can be utilized in order to generate natural language questions or queries in conducting search routines.

It is another object of the present invention to provide an apparatus and a method for identifying and/or for analyzing potential patent infringement which can be utilized in order to transmit questions or queries to a chat room and/or bulletin board and can receive a response(s) thereto.

It is still another object of the present invention to provide an apparatus and a method for identifying and/or for analyzing potential patent infringement which can be utilized in conjunction with any language and/or with any number of languages.

It is yet another object of the present invention to provide an apparatus and a method for identifying and/or for analyzing potential patent infringement which can be utilized in a language independent manner.

It is another object of the present invention to provide an apparatus and a method for identifying and/or for analyzing potential patent infringement which can be utilized in order to search patents or other publications which may reference a patent in question.

It is still another object of the present invention to provide an apparatus and a method for identifying and/or for analyzing potential patent infringement which can be utilized in order to ascertain and/or to determine an inventor(s) and/or an assignee of a patent(s) and/or any contact information and/or web site information corresponding thereto.

It is yet another object of the present invention to provide an apparatus and a method for identifying and/or for analyzing potential patent infringement which can be utilized in order to ascertain and/or to determine an author(s) or publisher(s) of a publication(s) and/or any contact information and/or web site information corresponding thereto.

It is another object of the present invention to provide an apparatus and a method for identifying and/or for analyzing potential patent infringement which can be utilized in order to generate claim chart information regarding a product(s) and/or a service(s) which infringes and/or potentially infringes an independent claim.

It is still another object of the present invention to provide an apparatus and a method for identifying and/or for analyzing potential patent infringement which can be utilized in order to perform an infringement analysis for any number of independent claims of a patent.

It is yet another object of the present invention to provide an apparatus and a method for identifying and/or for analyzing potential patent infringement which can be utilized in order to automatically perform any and/or all of the processing routines and/or functionality described herein.

Other objects and advantages of the present invention will be apparent to those skilled in the art upon a review of the Description Of The Preferred Embodiments taken in conjunction with the Drawings which follow.

DESCRIPTION OF THE PREFERRED EMBODIMENTS

Figure 1:
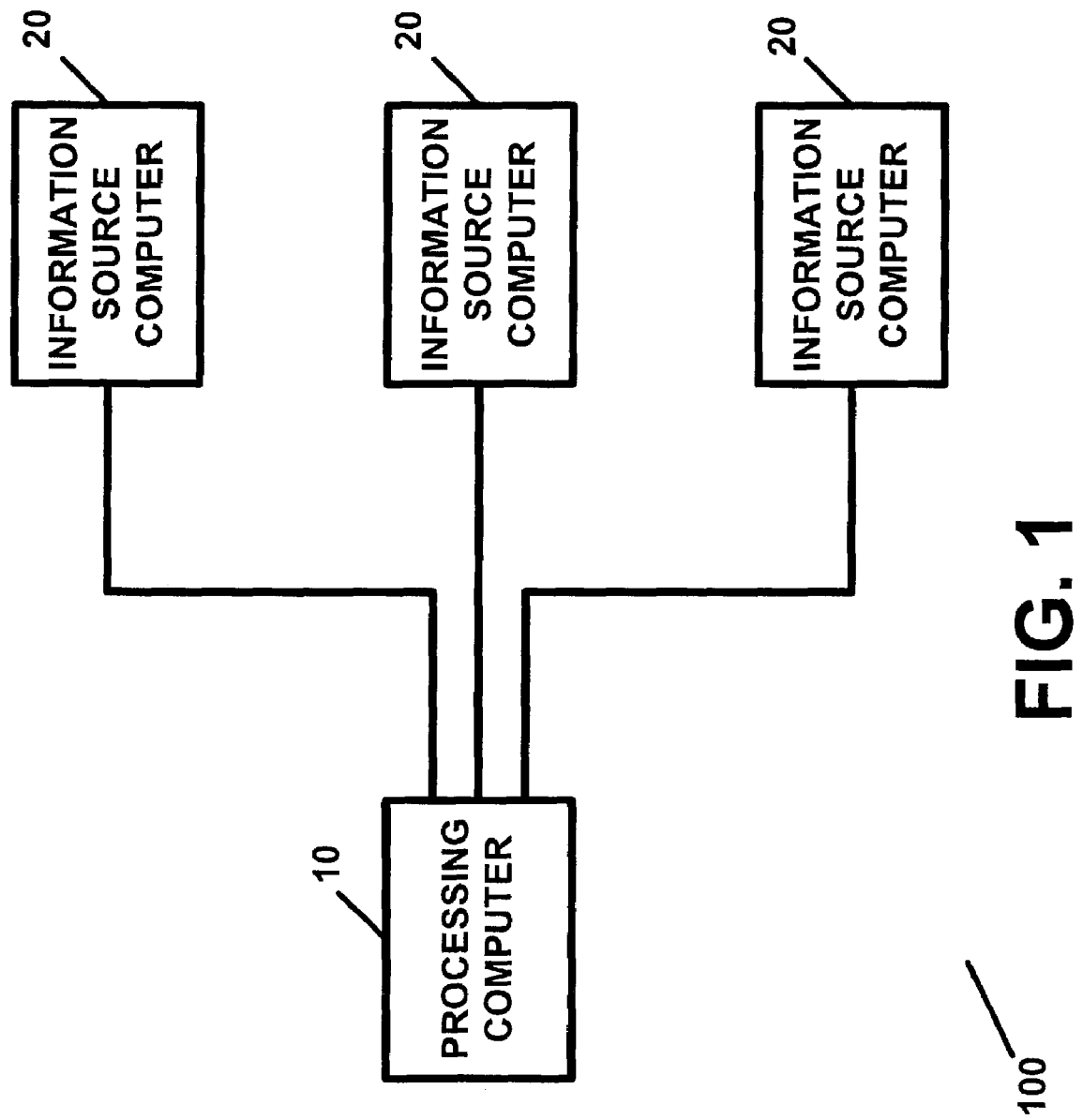
FIG. 1 illustrates a preferred embodiment of the apparatus of the present invention, in block diagram form.

The present invention pertains to an apparatus and a method for identifying and/or for analyzing potential patent infringement. The present invention also provides an apparatus and a method for determining and/or for providing information regarding whether or not a patent infringement may exist.

The present invention also provides an apparatus and a method which can be utilized in order to police for and/or to analyze a potential infringement. The present invention can also be utilized to identify an independent claim of a patent and/or the independent claims of a patent. The apparatus and method of the present invention can also be utilized in order to parse the language of an independent claim in order to identify claim limitations in the preamble as well as in the body of the claim.

The apparatus and method of the present invention can also be utilized in order to identify a product and/or a service covered by a patent. The apparatus and method of the present invention can also be utilized in order to identify one or more elements and/or limitations of a patent claim.

The apparatus and method of the present invention can also be utilized in order to formulate and/or construct a search and/or a search query for use in searching for a product(s) and/or a service(s) which may be infringing a patent. The search and/or search query can then be utilized in order to search a database, databases, and/or other information sources, in order to ascertain and/or to identify a product(s) and/or a service(s), or information which may be of interest in searching for a such a product(s) and/or a service(s), which may be infringing any claim or claims of a patent.

The apparatus and method of the present invention can also be utilized in order to parse the subject matter relating to any identified product(s) and/or service(s), and to identify any subject matter relating to and/or corresponding to information regarding claim preamble information and/or information regarding any claim element(s) and/or any claim limitation(s). The apparatus and method of the present invention can also be utilized in order to generate a claim chart, claim chart information, and/or a claim chart report, containing information regarding any of the identified product(s) or service(s) and how the respective information corresponds to the preamble and/or elements and/or limitations of a respective independent claim. The information contained in the claim chart, claim chart information, and/or claim chart report, can be utilized in conducting a patent infringement evaluation or study.

In a preferred embodiment, the apparatus of the present invention can be utilized in a stand-alone environment wherein all of the information utilized in performing the method of the present invention can be stored at, and/or can be provided at, the apparatus. In another preferred embodiment, the apparatus and method of the present invention can also be utilized in a network environment wherein the apparatus of the present invention can be utilized in conjunction with other computers and/or information sources which can be linked with the apparatus in the network environment.

FIG. 1 illustrates a preferred embodiment of the apparatus of the present invention, designated generally by the reference numeral 100, in block diagram form. With reference to FIG. 1, the apparatus 100 includes a processing computer 10. In the preferred embodiment, the processing computer 10 can perform any and/or all of the processing routines described herein as being performed by the apparatus 100 and method of the present invention.

In a preferred embodiment, the processing computer 10 can be any computer or computer system. The processing computer 10 can also be comprised of a plurality of computers and/or computer systems. The processing computer 10 can also be a personal computer, a desktop computer, a laptop or notebook computer, a central processing computer, a server computer, and/or any other suitable computer, computer system, and/or processing device or system.

With reference once again the FIG. 1, the apparatus 100 can also include any number of information source computers 20. In the preferred embodiment, the information source computer 20 can be any computer or computer system which stores and/or provides information which can be utilized in order to perform the processing routines and/or functionality described herein as being provided by the apparatus 100 and method of the present invention.

In a preferred embodiment, the information source computer 20 can include a database or memory storage device (not shown) which can include any data and/or information which can be utilized by the apparatus 100.

In a preferred embodiment, an information source computer 20 can be associated with, and/or can store and/or provide data and/or information regarding, any one or more of a number of information sources. The information sources can include information regarding any one or more of product information for any number of products and/or for any variety of products.

The product information can include product descriptions, descriptions of components, descriptions of product uses, subject matter of patents which cover a product or products, and any other information which can be utilized in performing the processing routines and/or functionality of the apparatus 100 and method of the present invention.

The information sources can also include information regarding services for any number of services and/or for any variety of services. The services information can include service descriptions, descriptions of processes, descriptions of service uses, subject matter of patents which cover a service or services, and any other information which can be utilized in performing the processing routines and/or functionality of the apparatus 100 and method of the present invention.

The information sources can also include data and/or information contained in any number or types of product catalogs, services catalogs, industry atlases, trade journals, technical journals, product manuals, service manuals, services manuals, industry journals, books, magazines, and/or other publications, Dialog databases, NERAK databases, Thomas Register databases, Derwent databases, and/or any other informational database or databases.

The information sources can also include software programs and/or algorithms for performing searches having any predefined and/or pre-selected accuracy or integrity constraints or definitions.

The information sources can also include patent databases containing information regarding any number of types or kinds of patents for any number of countries and/or national and/or regional patent offices.

The information sources can also include software programs and/or algorithms for analyzing any of the herein-described product information, services information, and/or patent information in conjunction with patent claim information. Software sold by Clear Forest Corp. of New York, N.Y., under the trademark ClearResearch may be useful in performing this analysis function. The information sources can also include software programs and/or algorithms for constructing and/or creating claim charts for claims and/or claim preambles, claim elements and/or claim limitations. The information sources can also contain software programs and/or algorithms for generating claim charts and/or related reports and/or information.

The information sources can also include information contained on web sites, in product catalogs, in service catalogs, in product descriptions, in services descriptions, in product reviews, in services reviews, industry review materials, in advertising materials and/or literature, in marketing materials and/or literature, and/or any other related information, associated with and/or regarding any respective manufacturers, services providers, wholesalers, and/or retailers, who or which may respectively manufacture, provide, sell, use, offer to sell, advertise, and/or otherwise engage in activities regarding products or services which may the subject of an infringement analysis or review, and/or any other information found in product atlases, services atlases, industry databases, and/or other information sources.

The information source computers 20 can also be any server computer, web site server computer, database storage computer, informational database computer, and/or central processing computer, patent office patent database computer (s) for any number of national patent offices and/or any number of regional patent offices, a search engine, a meta search engine, a computer which utilizes and/or deploys intelligent agents, a directory computer, a product index computer, a services index computer, and/or a hierarchical directory computer.

The processing computer 10 can transmit signals and/or information to, and receive signals and/or information from, any one or more of the information source computers 20 via any suitable communication network or system, including, but not limited to, a telecommunication network, the Internet, the World Wide Web, an RF signal communications network, a satellite communications network, an optical communications network, a public switched telephone network, a digital communications network, a personal communications services (PCS) communication network, a wireless communication network, and/or any other communication network or system, and/or any combination of same.

Figure 2:
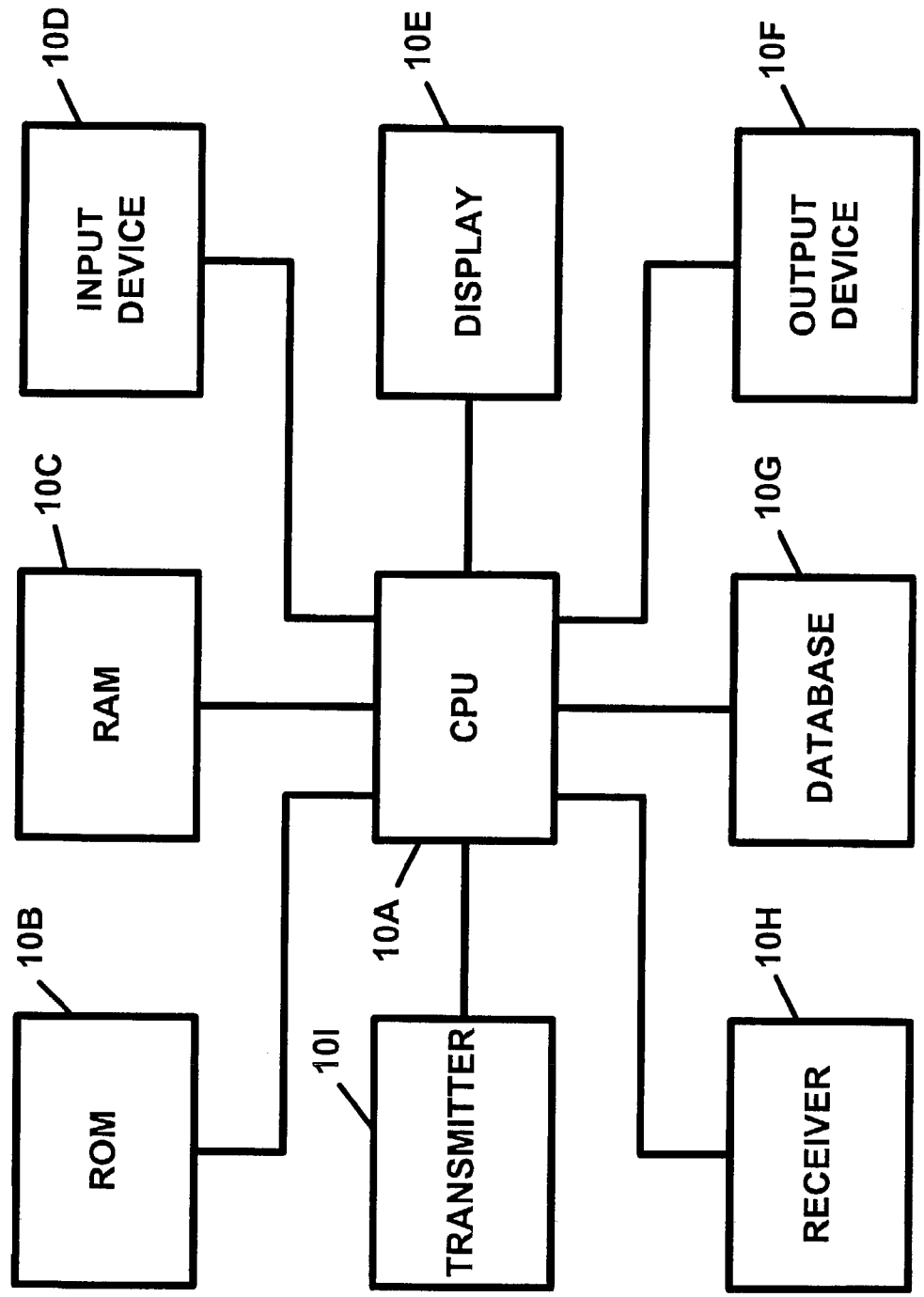
FIG. 2 illustrates a preferred embodiment of the processing computer of FIG. 1, in block diagram form.
Figure 3A:
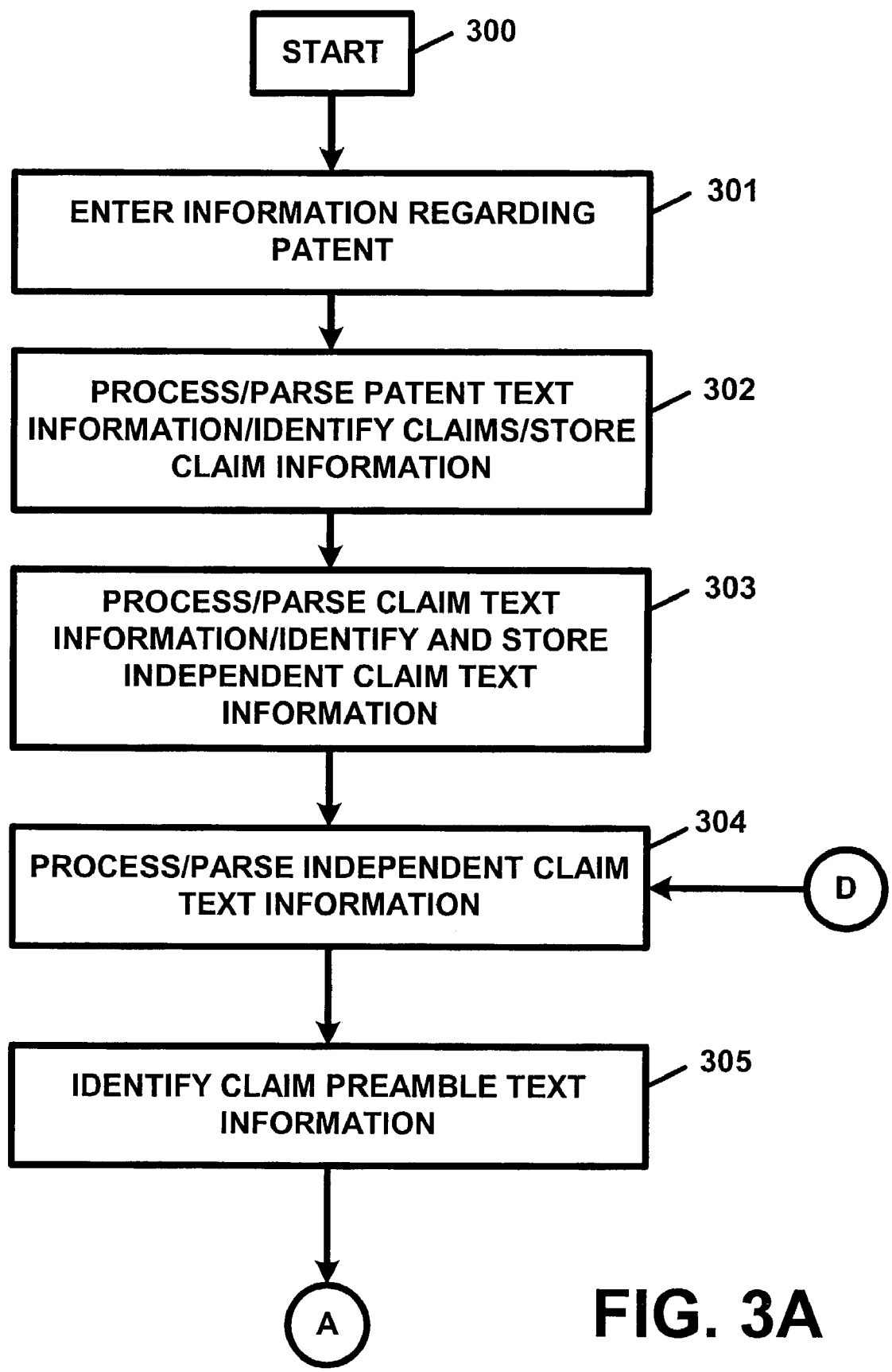
FIGS. 3A, 3B, 3C and 3D illustrate a preferred embodiment method for utilizing the apparatus of the present invention, in flow diagram form.
Figure 3B:
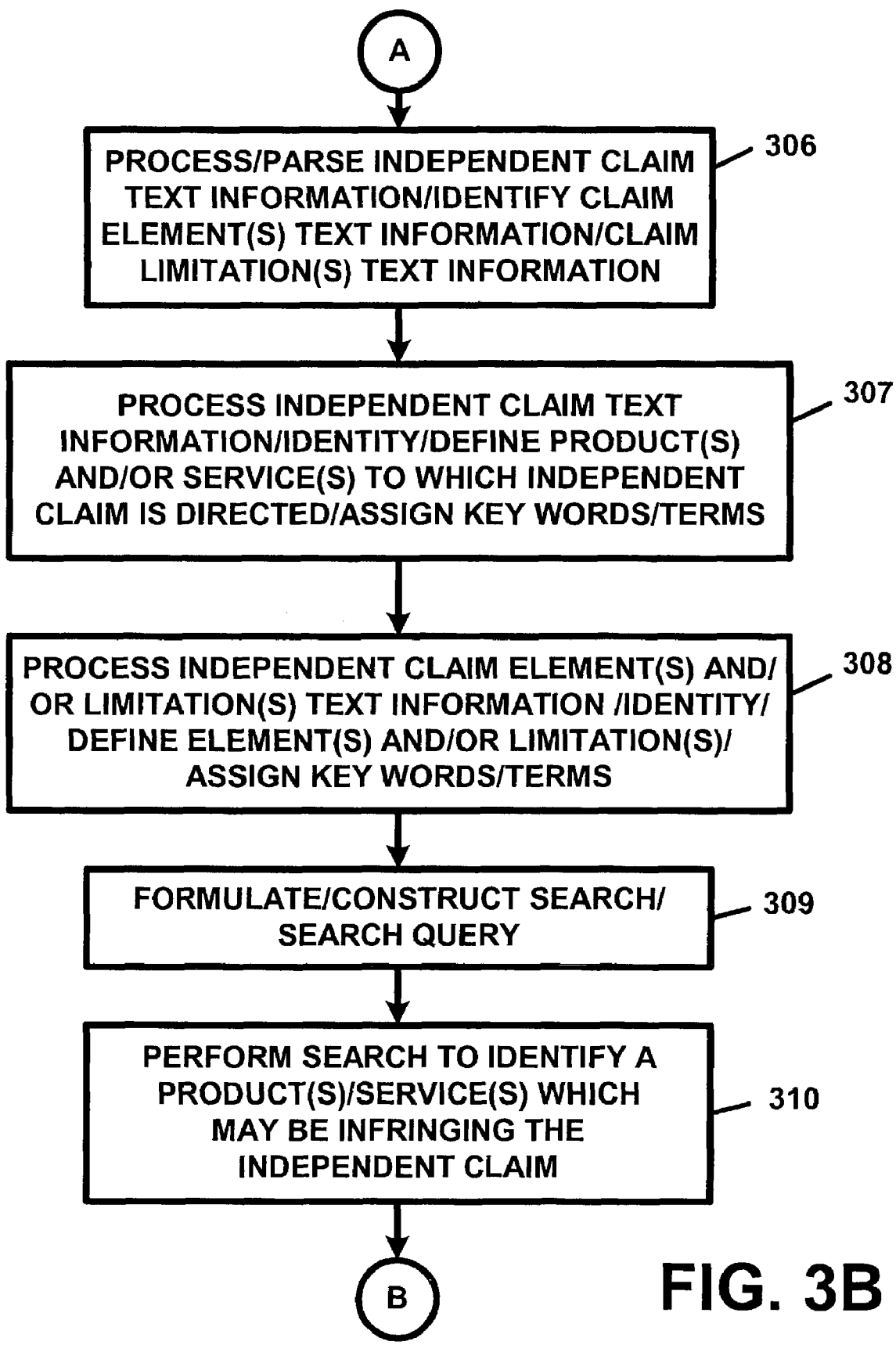
Figure 3C:
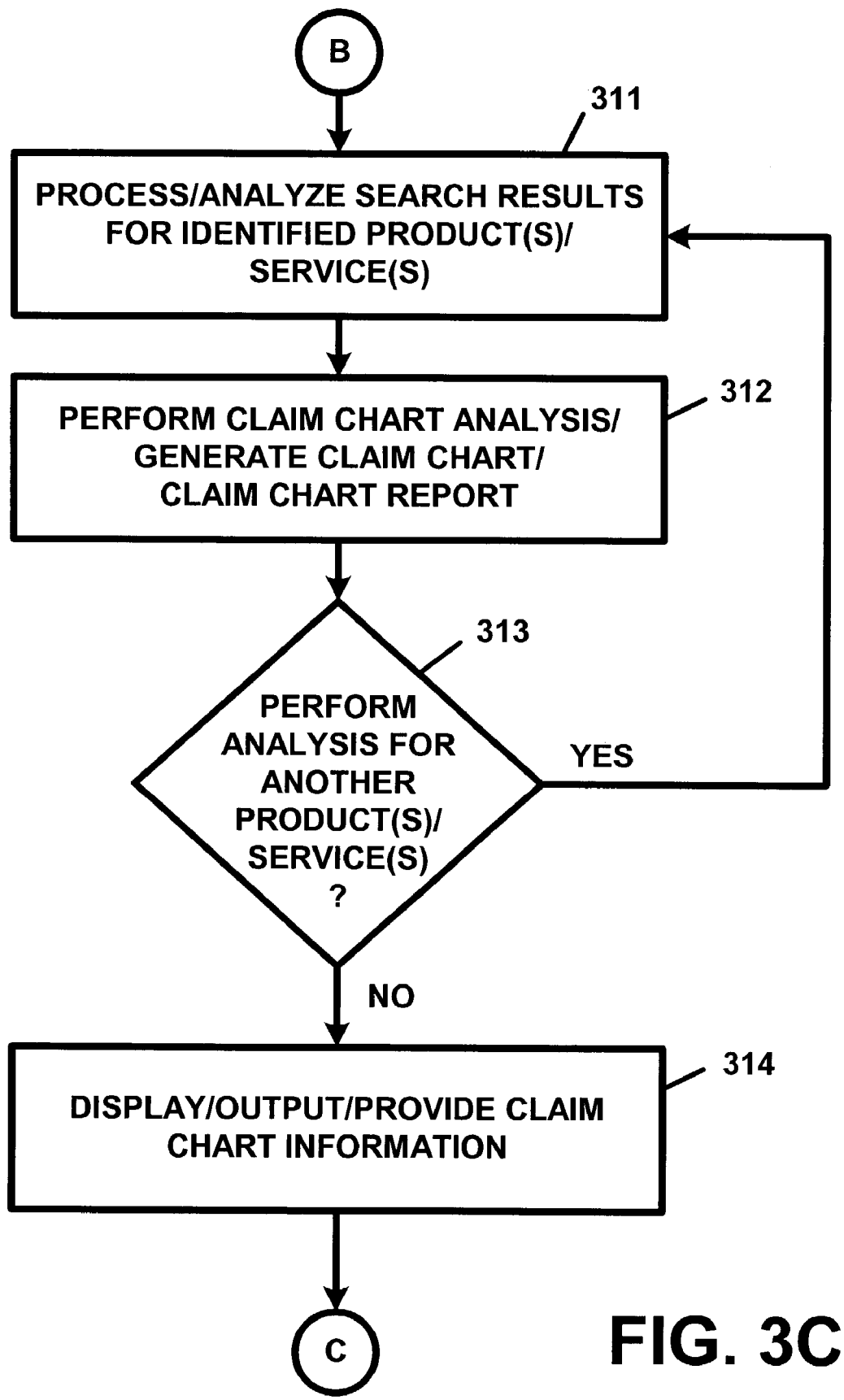
Figure 3D:
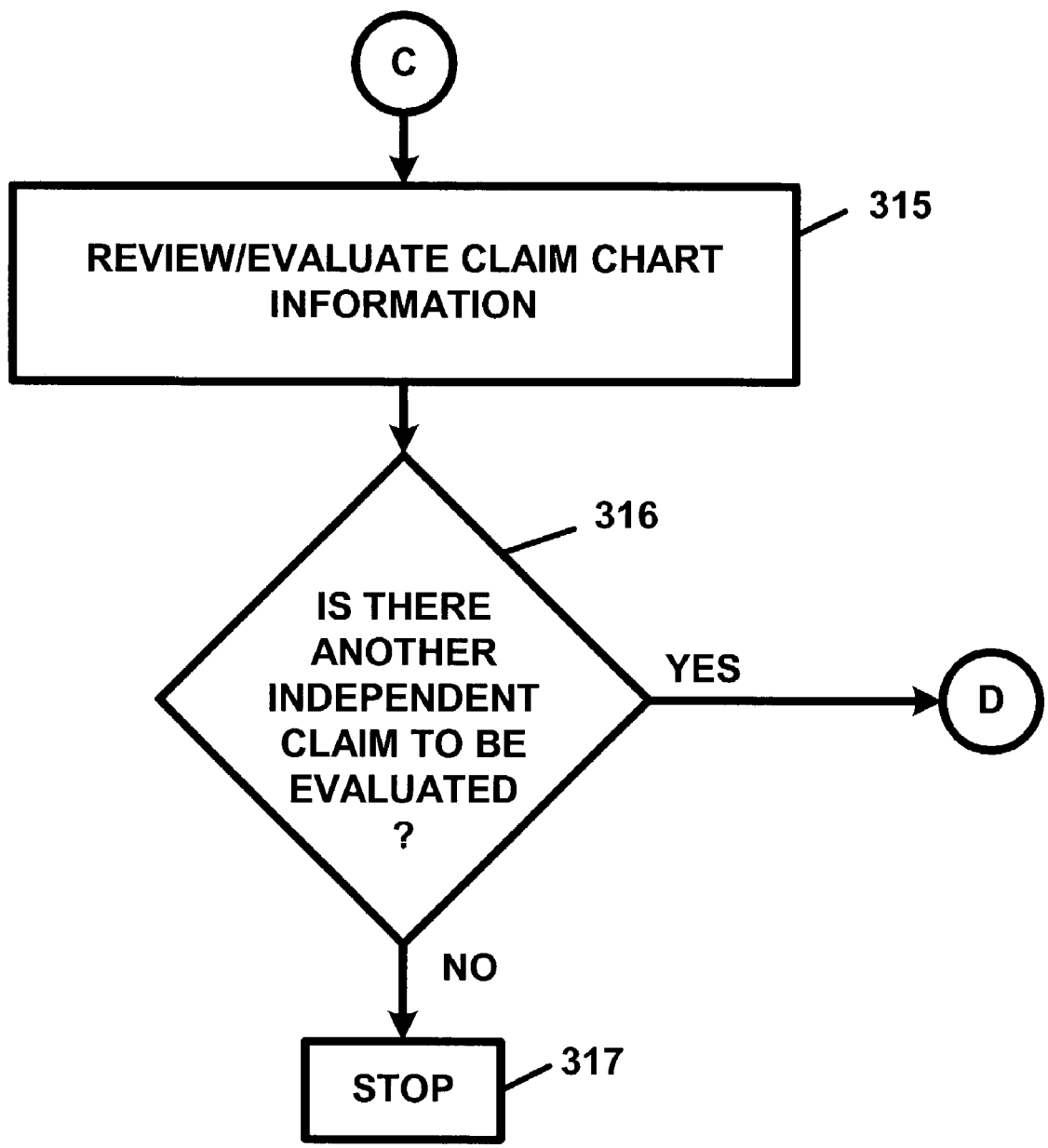

FIG. 2 illustrates a preferred embodiment of the processing computer 10 of FIG. 1, in block diagram form. The processing computer 10 can also be comprised of a plurality of computers and/or computer systems. The processing computer 10 can also be a personal computer, a desktop computer, a laptop or notebook computer, a central processing computer, a server computer, and/or any other suitable computer, computer system, and/or processing device or system. With reference to FIG. 2, the processing computer 10 includes a central processing unit (CPU) 10A which can perform any and all of the processing routines and/or functionality described herein as being provided by apparatus the present invention. The processing computer 10 also includes a read only memory device(s) 10B (ROM) and a random access memory device(s) 10C (RAM), each of which is connected to the central processing unit 10A.

The processing computer 10 can also include a user input device 10D, for entering data and/or commands into the processing computer 10, and which can include any one or more of a keyboard, a scanner, a user pointing device, such as, for example, a mouse, and/or a touch pad, which input device(s) are also connected to the central processing unit 10A. The processing computer 10 can also include a display device 10E for displaying data and/or information to a user. The processing computer 10 can also include an output device 10F, such as a printer or other output device for providing data and/or information to the user.

The processing computer 10 can also include a database(s) 10G which can contain any and/or all of the data and/or information which may be needed and/or desired in performing any of the processing routines and/or functionality described herein as being provided by the apparatus and method of the present invention.

The database 10G can contain patent information, including subject matter of any of the patents for which any of the herein-described routines can be utilized. The database 10G can also contain any one or more of software programs and/or algorithms for parsing patent language in order to identify a claim or claims of a patent, software programs and/or algorithms for parsing patent language in order to identify an independent claim or independent claims of a patent, software programs and/or algorithms for parsing a claim and/or an independent claim in order to identify the claim preamble, claim elements, and/or claim limitations, software programs and/or algorithms for identifying key words, claim elements, and/or claim limitations, in order to determine a product and/or service to which a claim is directed and/or which is covered by a claim, software programs and/or algorithms for identifying key words for describing elements and/or limitations of a claim, software programs and/or algorithms for performing text analysis processing routines, software programs and/or algorithms for performing text analysis processing routines in any language and/or in any number of languages, software programs and/or algorithms for performing semantic analysis processing routines, software programs and/or algorithms for performing semantic analysis processing routines in any language and/or in any number of languages, and/or software programs and/or algorithms for performing any of the herein-described processing routines by utilizing artificial intelligence techniques and/or routines.

The database 10G can also contain software programs and/or algorithms for constructing searches, search queries, Boolean searches, and/or other types or kinds of searches, in order to search for products and/or services, and/or any intellectual property or intellectual properties, which may describe products and/or services. The database 10G can also contain software programs and/or algorithms containing the subject matter of dictionaries and/or thesauruses, in any number of languages, in electronic form, and/or any other software programs and/or algorithms for identifying synonyms for any words or terms utilized in constructing any search or search query.

The database 10G can also contain product information for any number of products and/or for any variety of products. The product information can include product descriptions, descriptions of components, descriptions of product uses, subject matter of patents which cover a product or products, and any other information which can be utilized in performing the processing routines and/or functionality of the apparatus 100 and method of the present invention.

The database 10G can also contain information regarding services for any number of services and/or for any variety of services. The services information can include service descriptions, descriptions of processes, descriptions of service uses, subject matter of patents which cover a service or services, and any other information which can be utilized in performing the processing routines and/or functionality of the apparatus 100 and method of the present invention.

The database 10G can also contain data and/or information contained in any number or types of product catalogs, services catalogs, industry atlases, trade journals, technical journals, product manuals, service manuals, services manuals, industry journals, books, magazines, and/or other publications, Dialog databases, NERAK databases, Thomas Register databases, Derwent databases, and/or any other informational database or databases.

The database 10G can also contain software programs and/or algorithms for performing searches having any pre-defined and/or pre-selected accuracy or integrity constraints or definitions.

The database 10G can also contain patent databases containing information for any number of types or kinds of patents for any number of countries and/or national and/or regional patent offices.

The database 10G can also contain software programs and/or algorithms for analyzing any of the herein-described product information, services information, and/or patent information, in conjunction with patent claim information. The database 10G can also contain software programs and/or algorithms for generating and/or creating claim charts for claims and/or claim preambles, claim elements and/or claim limitations. The database 10G can also contain software programs and/or algorithms for generating claim charts and/or related reports and/or information.

The database 10G can also contain software programs and/or algorithms for analyzing information contained on web pages and/or web sites.

The database 10G can also contain information which can be contained in, and/or stored at, any information source computers 20 or information sources, such as server computers, web site server computers, database storage computers, informational database computers, and/or central processing computers, patent office patent database computers for any number of national patent offices and/or for any number of regional patent offices, search engine software programs, meta search engine software programs, intelligent agent software programs, directory information, product index information, services index information, hierarchical directory information, and/or information contained on web sites, in product catalogs, in service catalogs, in product descriptions, in services descriptions, in product reviews, in services reviews, industry review materials, in advertising materials and/or literature, in marketing materials and/or literature, and/or any other related information, information associated with and/or regarding any respective manufacturers, services providers, wholesalers, and/or retailers, who or which may respectively manufacture, provide, sell, use, offer to sell, advertise, and/or otherwise engage in activities regarding products or services which may the subject of an infringement analysis or review.

The database 10G can also contain links and or hyperlinks to any information which can be contained in any of the herein-described information source computers 20 or information sources, such as server computers, web site server computers, database storage computers, informational database computers, and/or central processing computers, patent office patent database computers for any number of national patent offices and/or for any number of regional patent offices, search engine software programs, meta search engine software programs, intelligent agent software programs, directory information, product index information, services index information, hierarchical directory information, and/or information contained on web sites, in product catalogs, in service catalogs, in product descriptions, in services descriptions, in product reviews, in services reviews, industry review materials, in advertising materials and/or literature, in marketing materials and/or literature, and/or any other related information, information associated with and/or regarding any respective manufacturers, services providers, wholesalers, and/or retailers, who or which may respectively manufacture, provide, sell, use, offer to sell, advertise, and/or otherwise engage in activities regarding products or services which may the subject of an infringement analysis or review.

The database 10G can also contain information found in product atlases, services atlases, industry databases, and/or other information sources.

The database 10G can also contain software programs and/or algorithms for generating and/or for providing chat room and/or on-line bulletin board search queries and/or software programs and/or algorithms for receiving chat room and/or on-line bulletin board responses. The database 10G can also contain software programs and/or algorithms for communicating with chat room participants, and/or product or services manufacturers, wholesalers, retailers, and/or their respective marketing and/or customer service departments.

The database 10G can also contain software programs and/or algorithms for generating natural languages searches and/or search queries. The database 10G can also contain software programs and/or algorithms for generating searches and/or search queries in any number of different languages.

The processing computer 10 can also include a receiver 10H for receiving data and/or information, including any of the herein-described information, and/or any of the other information described herein as being provided to the processing computer 10, from any one or more of the herein-described information source computers 20. The receiver 10H can be connected to the CPU 10A. In another preferred embodiment, wherein the processing computer 10 can be utilized to provide any processing functionality to a computer or communication device (not shown), the receiver 10H can also receive an information request or requests from the computer or communication device.

The processing computer 10 can also include a transmitter 10I for transmitting data and/or information, and/or a request for data and/or information, to any one or more of the herein-described information source computer(s) 20. The transmitter 10I can be connected to the CPU 10A. In another preferred embodiment, wherein the processing computer 10 can be utilized to provide any processing functionality to a computer or communication device (not shown), the transmitter 10I can also transmit information to the computer or communication device.

In a preferred embodiment, the apparatus 100 and method of the present invention can be utilized in order to identify and/or to search for instances of patent infringement. The apparatus 100 and method of the present invention can also be utilized in order to analyze potential patent infringement and/or instances of potential patent infringement.

In a preferred embodiment, the apparatus 100 and method of the present invention can also be utilized in order to process and/or to parse patent language in order to identify an independent claim or independent claims of the patent. The apparatus 100 and method of the present invention can identify and store an independent claim or independent claims of a patent.

In a preferred embodiment, the apparatus 100 and method of the present invention can process and/or parse the information contained in each independent claim in order to identify the preamble of the claim. The apparatus 100 and method of the present invention can also process and/or parse the language contained in each independent claim in order to identify a claim element(s) and/or a claim limitation(s). In a preferred embodiment, the apparatus 100 and method of the present invention can utilize any one or more of artificial intelligence processing techniques, text analysis processing techniques, and/or semantic analysis processing techniques.

In a preferred embodiment, the apparatus 100 and method of the present invention can also be utilized in order to identify a product and/or a service to which a patent claim or patent claims are directed. The apparatus 100 and method of the present invention can also identify a key word(s), term(s), and/or concept(s), for a claim element(s) and/or a claim limitation(s) in order to identify a product and/or service to which a patent claim is directed. The apparatus 100 and method of the present invention can also be utilized in order to assign a key word(s), term(s), or category information, to an identified product and/or service to which a patent claim is directed.

The apparatus 100 and method of the present invention can also be utilized in order to identify a key word(s), term(s), and/or category information, for any number of claim elements and/or claim limitations of a patent claim or patent claims.

The apparatus 100 and method of the present invention can also be utilized in order to formulate and/or generate or construct a search or search query which can contain any of the information described herein as being identified and/or utilized in order to describe the product and/or service to which a patent claim is directed and/or any of the information described herein which is identified and/or utilized in order to describe any of the claim elements and/or claim limitations of the patent claim. The search and/or search query, in the preferred embodiment, can contain, and/or can be formulated or generated, by using, synonyms, dictionary definitions, equivalent terms, foreign language translations, and/or slang terms, etc., which may be associated with and/or which may be customarily used for, or used in place of, any of the respective key words, terms, and/or information.

The apparatus 100 and method of the present invention can also be utilized to perform a search of information and/or database information, containing information on products and/or services, by utilizing the key words, terms, and/or information, contained in the search or search query to identify products and/or services which may be a potential infringement of the patent claim corresponding to the search or search query.

In a preferred embodiment, the apparatus 100 and method of the present invention can identify a product(s) and/or a service(s) by searching information and/or descriptive information regarding products and/or services for the presence of key words, terms, and/or information, contained in the search or search query.

The apparatus 100 and method of the present invention can identify a product(s) and/or a service(s) which may be infringing the patent claim. The apparatus 100 and method of the present invention can also be utilized in order to generate and/or create a claim chart, claim chart information, and/or a claim chart report, which can contain information regarding the identified product(s) and/or service(s) as it may related to any of the claim preamble and/or any of the claim elements and/or claim limitations.

The apparatus 100 and/or method of the present invention can also be utilized so as to highlight, underline, embolden, and/or otherwise call attention to, key words, terms, and/or information, in the descriptive information regarding the product(s) and/or service(s) which match any of the key words, terms, and/or information, in the search or search query.

The information contained in the generated claim chart, claim chart information, and/or claim chart report, can be utilized in order to perform a patent infringement study and/or analysis.

FIGS. 3A, 3B, 3C and 3D illustrate a preferred embodiment method for utilizing the apparatus 100 of the present invention, in flow diagram form. With reference to FIGS. 3A, 3B, 3C and 3D, the operation of the apparatus 100 commences at step 300.

At step 301, information regarding a patent which is to be analyzed can be entered into the processing computer 10.

At step 301, a user can enter the patent number for the patent of interest and the processing computer 10 can retrieve the patent text information from the database 10G. In another preferred embodiment, the patent text information can be entered into and/or loaded into the processing computer 10 at step 301.

At step 302, the processing computer 10 can process and/or parse the patent text in order to identify the claims in the patent. In a preferred embodiment, the processing computer 10 can utilize any one or more of any suitable word processing searching techniques, text analysis processing techniques, and/or semantic analysis processing techniques, in order to find and/or to identify the claims of the patent. For example, the processing computer 10 can search the patent text for words, terms, and/or phrases, such as "Claims", "I Claim", "We Claim", "What Is Claimed Is", etc. At step 302, the processing computer 10 can identify all of the patent claims and store the claim text information for the claims in a memory location or storage area.

At step 303, the processing computer 10 can process and/or parse the claim text in order to identify and store the independent claim text information for the independent claims of the patent. In a preferred embodiment, the independent claim text information is utilized in order to perform the patent analysis routines described herein as independent claims can typically be viewed as containing the broadest descriptive information of the property right(s) protected by the patent.

In another preferred embodiment, the processing computer 10 can perform any and/or all of the processing routines described herein for all of the patent claims, including the independent claims as well as any dependent claims.

In a preferred embodiment, the processing computer 10 can identify the independent claims as those claims which do not contain references to other claims which are found in dependent claims, such as terms or phrases as "The apparatus of claim 1", "An apparatus in accordance with claim 1", etc. Upon identifying a claim or claims which do not contain such references to other claims, the processing computer 10 can identify the claim as an independent claim.

In another preferred embodiment, the processing computer 10 can identify dependent claims by identifying the claims having such terms or phrases as "The apparatus of claim 1", "An apparatus in accordance with claim 1", etc., and discard such claims as not being independent claims. At step 303, the processing computer 10 can process and/or parse the patent claim text in order to identify all of the independent claims of a patent. At step 303, the processing computer 10 can also store the independent claim text information in the memory location or storage area for later processing as described herein.

In the above described manner, the processing computer 10 can isolate and store the independent claim text information for all of the independent claims of the patent.

At step 304, the processing computer 10 can process and/or parse the text information for an independent patent claim. At step 305, the processing computer 10 can process and/or parse the text information of an independent claim in order to identify the preamble of the patent claim. In a preferred embodiment, the processing computer 10 can utilize any one or more of any suitable word processing searching techniques, text analysis processing techniques, and/or semantic analysis processing techniques, in order to find and/or identify a key word(s), term(s), phrase(s), and/or punctuation mark(s), such as "which comprises", "comprising", "consisting of", ":", ";", word processing paragraph return code(s), and/or any other words, terms, phrases, punctuation marks, and/or code(s), which typically can be used to identify a preamble of a claim and/or an independent claim. At step 305, the processing computer 10 can identify and store the preamble text information for the independent claim.

At step 306, the processing computer 10 can process and/or parse the text information of an independent claim in order to identify the claim elements and/or claim limitations of the independent claim. In a preferred embodiment, the processing computer 10 can utilize any one or more of any suitable word processing searching techniques, text analysis processing techniques, and/or semantic analysis processing techniques, in order to find and/or identify a key word(s), term(s), phrase(s), colon(s), semi-colon(s) and/or other punctuation mark(s), number(s) and/or letter(s), associated with an element or limitation, a bullet marking(s) to identify an element or limitation, a word processing paragraph code(s) and/or a paragraph return code(s), and/or any other word(s), term(s), phrase(s), punctuation mark(s), and/or word processing code(s), which typically can be used to separate and/or identity claim elements and/or claim limitations.

At step 306, the processing computer 10 can identify and store the text information for each identified claim element and/or claim limitation.

Upon the conclusion of steps 305 and 306, the preamble text information and the text information for the claim elements and/or claim limitations are identified and stored for later processing of same. In this manner, in the preferred embodiment, the processing computer 10 can be utilized in order to process and/or parse the text of an independent claim so as to isolate the preamble and the claim elements and/or claim limitations, of the independent claim, so as to, in effect, "break-up" the independent claim text information into its component preamble text portion and claim element text portion(s) and/or claim limitation text portions(s).

In a preferred embodiment, the processing computer 10 can also provide information regarding the identified preamble text information and/or the text information for the identified claim element(s) and/or claim limitation(s) to a user, such as by displaying same via the display device 10E and/or by outputting same via the output device 10F.

At step 307, the processing computer 10 can process the independent claim text information in order to determine and/or ascertain a definition or definitions for the product(s) and/or service(s) to which the independent claim is directed and/or the product(s) and/or service(s) which are covered under and/or which fall within the scope of the independent claim.

At step 307, the processing computer 10 can process and/or parse the independent claim text information, including the preamble text information and/or the text information regarding the claim element(s) and/or the claim limitation(s). At step 307, the processing computer 10 can assign a word(s), key word(s), and/or term(s), to the product(s) and/or service(s) to which the independent patent claim is directed. For example, if the independent claim being analyzed is directed to a vehicle locating apparatus which includes a global positioning system device at the vehicle and a transmitter for transmitting the positioning information to a central station computer, then the processing device 10 can, after processing and/or parsing the preamble text information and/or the text information regarding the claim element(s) and/or the claim limitation(s), can assign key words or terms such as "vehicle locating device", "global positioning locating device", "vehicle location monitoring service", etc. for defining the product(s) and/or service(s) to which the independent claim is directed.

At step 307, the processing computer 10 can also assign the product(s) and/or service(s), to which the independent claim is directed, to a category. The information obtained and/or generated by the processing computer 10, at step 307, can be stored by the processing computer 10.

At step 308, the processing computer 10 can process the text information for each claim element and/or for each claim limitation in order to ascertain the definition of the respective claim element(s) and/or claim limitation(s). For example, if a claim element is directed to "a global positioning device located at a vehicle", the processing computer 10 can assign the key words or terms "at the vehicle", "vehicle mounted", etc., to the claim element or claim limitation. The information obtained and/or generated by the processing computer 10 at step 308 can also be stored by the processing computer 10.

Upon the completion of steps 307 and 308, the processing computer 10 will have ascertained and stored information, including key words and/or terms, regarding the product(s) and/or service(s) to which the independent claim is directed, as well as information, including key words and/or terms, regarding the claim element(s) and/or the claim limitation(s) of the independent claim.

At step 309, the processing computer 10 can formulate and/or construct a search and/or a search query in order to perform a search for a product(s) and/or a service(s) which may be covered by, and/or which may infringe, the independent claim. At step 309, the processing computer 10 can perform a search of any relevant database or databases in order to identify any products and/or services which may be a potential and/or actual infringement of the independent claim.

In a preferred embodiment, the present invention can utilize a Boolean search and/or a Boolean search query and/or any other form of search and/or search query. In the preferred embodiment, the search and/or search query can be formulated by using the key words, terms, and/or other information, regarding the product(s) and/or service(s) and/or the claim element(s) and/or the claim limitation(s) which were identified at the respective steps 307 and 308. The search and/or search query, in the preferred embodiment, can be formulated by using any synonyms, dictionary definitions, equivalent terms, foreign language translations, and/or slang terms, etc., which may be associated with, and/or which may be customarily used for, or in place of, any of the respective key words, terms, and/or information.

An example of a search or search query, associated with the independent claim directed to the exemplary vehicle locating apparatus, can include the following search words, terms and/or connectors:

(vehicle or car or auto or automobile)
AND (location or locate or locating or positioning)
AND (apparatus or system or device)
AND (("global positioning" and (device or system))
AND ("at vehicle" or "in vehicle" or mounted)
AND (transmit or transmitter or transceiver)
AND (office or "central station" or computer or server).

In the preferred embodiment, the processing computer 10 can, at step 309, formulate the search and/or search query by utilizing information stored in the database 10G, which can, for example, include dictionary information, thesaurus information, industry atlas information, product information, services information, and/or any other information which can be utilized in order to formulate a more complete and comprehensive search or search query for, or regarding, the key words, terms, and/or information, identified as being associated with and/or corresponding to the product(s) and/or service(s) to which the independent claim is directed and/or to any of the claim element(s) and/or claim limitation(s). At step 309, the processing computer 10 can also formulate and store the search or search query for the independent claim.

At step 310, the processing computer 10 can perform a search in order to locate and/or identify a product(s) and/or a service(s) which may be infringing the independent claim. The processing computer 10 can perform the search regarding the independent claim by searching any of the information described herein as being stored in the database 10G and/or any of the herein-described information which can also be stored in any of the information source computers 20.

In a preferred embodiment, the processing computer 10 can perform a "stand-alone" search wherein the processing computer 10 searches information contained in the database 10G. In another preferred embodiment, the processing computer 10 can perform a search involving the information stored in the database 10G as well as any information stored in any respective information source computer 20 or information source computers 20. In another preferred embodiment, the processing computer 10 can perform a search involving information stored at a respective information source computer 20 or computers 20.

In a preferred embodiment, the processing computer 10 can perform a search involving and/or including any number of databases and/or information sources, including, but not limited to, any one or more of a Dialog database, a NERAK database, a Thomas Register database, a Derwent database, a product database(s), a services database(s), and/or any of the database(s), information source(s), catalog(s), atlas or atlases, etc., described herein as being stored in the database 10G and/or in any of the information source computer(s) 20.

In the preferred embodiment, a user can also pre-define and/or pre-select criteria regarding an accuracy or an integrity of a search. For example, a user can select any percentage number defining a search integrity or accuracy. For example, a user can pre-define a search to include or contain 60%, 70%, 80%, or 90%, of the words, terms, and/or information, contained in the search or search query. Any percentage number can be pre-defined and/or pre-selected, and/or can be pre-programmed into the processing computer 10. If for example, a 60% accuracy number is defined, then the processing computer 60 can perform a search and obtain results which can include information regarding a product, products, a service, and/or services, wherein the resulting information can contain at least 60% of the key words, terms, and/or information, contained in the search and/or search query.

Any accuracy or integrity percentage can be pre-defined and/or pre-selected. In a preferred embodiment, the search results can also include results wherein key words, terms, and/or information, of the search and/or search query can be found in a same sentence, in a same description, and/or within a pre-defined proximity to other key words, terms, and/or information.

In a preferred embodiment, the processing computer 10 can also, at step 310, search and analyze web page content and/or web site content for any product(s) and/or service(s) which are, or which may be, the same as, an equivalent of, similar to, and/or analogous to, the product(s) and/or service(s) to which the independent claim is directed. In a preferred embodiment, the processing computer 10 can also search and analyze the content of a web page or web pages and/or a web site or web sites in order to locate, identify, and process, information and/or descriptions of a product, products, a service, and/or services.

The processing computer 10 can also utilize various searching tools, programs, intelligent agents, search engines, search engines such as Web Ferret, Google, etc., web site directories, search engine directories, hierarchical directories, and/or techniques in order to search any number of web sites and/or server computers on the Internet and/or the World Wide Web.

The processing computer 10 can also search web sites associated with a product, products, a service, and/or services, trade associations, technical associations, industry associations, and/or manufacturers, wholesalers, and/or retailers, of any product, products, service, and/or services. The processing computer 10 can also search advertising literature and/or materials stored in databases and/or on web sites, marketing literature and/or materials stored in databases and/or on web sites, articles, literature, and/or materials, which review products and/or services, and/or any manufacturer and/or distributor literature and/or materials regarding products and/or services. The processing computer 10 can also perform searches of on-line catalogs and/or marketing sites.

The processing computer 10 can also be utilized in order to communicate with, participate in, and/or utilize, chat rooms and/or on-line bulletin boards in order to obtain information. In a preferred embodiment, the processing computer 10 can generate natural language question or queries, transmit same to the chat room and/or on-line bulletin board, and receive any responses thereto. For example, the processing computer 10 can generate a message such as "Does anyone know of a product/service which has the following features . . . ?".

In a preferred embodiment, any and/or all of the searches and/or search queries, and/or any of the messages, generated by the processing computer 10 in performing its search routine or search routines can be in any language and/or in any number of languages. In this manner, the apparatus 100 and method of the present invention can operate in any language and/or in a language independent manner.

In another preferred embodiment, the processing computer 10, at step 310, can search patents or other publications which may reference the patent in question. In this manner, the processing computer 10 can search U.S. Patent Office databases, as well as foreign national patent office databases and/or foreign regional patent office databases. The processing computer 10 can also ascertain and/or determine an inventor(s) and/or an assignee of a patent and/or any contact information and/or web site information corresponding thereto and/or an author(s) or publisher(s) of a publication(s) and/or any contact information and/or web site information corresponding thereto.

The processing computer 10 can also, at step 310, search information and/or literature regarding a product, products, a service, and/or services, which may be marked with a patent number, a patent pending notice, and/or any other related information which may be of interest in attempting to identify instances of patent infringement.

At step 310, the processing computer 10 can also acquire, obtain, record, and/or store, the search results and/or the information obtained in response to the search and/or search query and/or information obtained as a result of the searching routines.

At step 311, the processing computer 10 can process and/or analyze the search results and any information obtained from the search in conjunction with the key words, terms, and/or information, contained in the claim preamble and the claim elements and/or claim limitations, for the identified product(s) and/or service(s).

At step 311, the processing computer 10 can process the information obtained for each product and/or service identified from the search as being pertinent to the independent claim. At step 311, the processing computer 10 can process the information regarding each product and/or service, identified in the search, in conjunction with the claim preamble text information and the text information for the claim elements and/or the claim limitations. At step 311, the processing computer can also determine whether the product and/or service information contains information for determining if the product and/or service has elements, components, processes, steps, features, and/or functionality, which is covered by the claim preamble and each of the claim elements and/or claim limitations.

At step 312, the processing computer 10 can perform a claim chart analysis and generate a claim chart report containing claim chart information for the independent claim. The claim chart information can provide the claim preamble along with the claim elements and/or claim limitations for the independent claim. The claim chart information can include, for the claim preamble and for each of the claim elements and claim limitations, information regarding whether an identified product or service exhibits or contains features and/or limitations, of the claim preamble and any of the elements and limitations, of the independent claim.

The processing computer 10 can, at step 312, generate a claim chart report containing claim chart information for each product and/or service identified in the search. In this manner, the processing computer 10 can generate claim chart information for the independent claim illustrating whether and how an identified product and/or service may be infringing the independent claim. In a preferred embodiment, descriptive words, elements, and/or features, of the identified product and/or service description can be inserted verbatim and/or otherwise into the claim chart. Any words, key words, terms, and/or information, which match the keywords, terms, and/or information, of the claim text can be highlighted, underlined, and/or emboldened, in order to call attention to the match. At step 312, the processing computer 10 can store the claim chart report for the respective product and/or service.

At step 313, the processing computer 10 will determine whether a claim chart analysis is to be performed for another identified product and/or service. If, at step 313, it is determined that another product and/or service is to be evaluated in a claim chart analysis, then the processing computer 10 will proceed to step 311 and the processing operations described herein as being performed in steps 311 through 313 will be performed for the next identified product and/or service. If, however, at step 313, it is determined that no other product and/or service is to be evaluated, then the operation of the processing computer 10 will proceed to step 314.

At step 314, the processing computer 10 will display the information contained in the claim chart and/or claim charts which are generated at step 312 via the display device 10E and/or output the information contained in the claim chart and/or claim charts via the output device 10F, such as by printing out the claim chart or claim charts.

Thereafter, at step 315, the information contained in the claim chart and/or claim charts can be reviewed and/or evaluated in order to determine if a potential patent infringement of the independent claim exists and/or if an actual patent infringement of the independent claim exists.

At step 316, the processing computer 10 will determine whether another independent claim is to be analyzed and/or a search performed for same. If at step 316, it is determined that another independent claim is to be analyzed and/or a search performed for same, then the operation of the processing computer 10 will perform the processing routines described herein as being performed in steps 304 through 315 for the next independent claim. If, at step 316, it is determined that no additional independent claim(s) is to be analyzed and/or searched, then the operation of the apparatus 100 will cease at step 317.

In another preferred embodiment, the apparatus 100 can be programmed to automatically perform any and/or all of the processing routines and/or functionality described herein.

The apparatus 100 and/or the processing computer 10 can utilize artificial intelligence processing techniques and/or routines. Applicant hereby incorporates by reference herein the subject matter and teachings of *The Handbook of Artificial Intelligence*, Avron Barr, et al., Vols. 1-3, 1982, William Kaufmann, Inc. The apparatus 100 and method of the present invention can also utilize word processing routines, text analysis routines, and/or semantic analysis routines.

Figure 4:
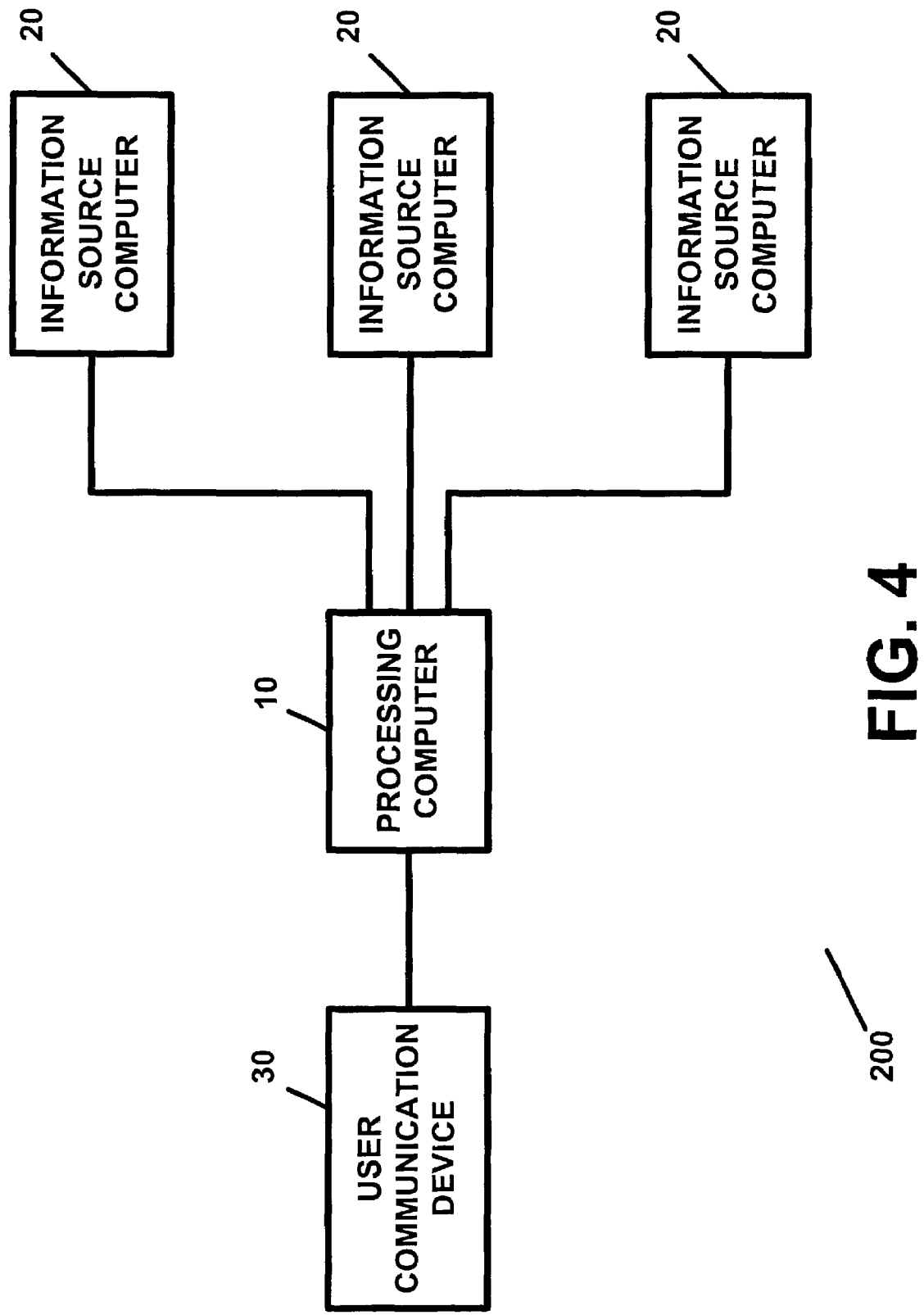
FIG. 4 illustrates another preferred embodiment of the apparatus of the present invention, in block diagram form.

In another preferred embodiment, the apparatus and method of the present invention can be utilized in order to provide any of the herein-described processing routines and/or functionality in conjunction with a user computer or communication device. FIG. 4 illustrates another preferred embodiment of the apparatus of the present invention, which is designated generally by the reference numeral 200, in block diagram form.

With reference to FIG. 4, the apparatus 200 includes a processing computer 10 and any number of information source computers 20. The apparatus 200 also includes a user computer or communication device 30 (hereinafter "user communication device 30") which can be utilized to communicate, in a bi-directional manner, with the processing computer 10 and any of the information source computers 20. The user communication device 30 can contain a central processing unit, a read-only memory (ROM), a random access memory (RAM), an input device, a display device, an output device, such as a printer, a database, a receiver and a transmitter.

The apparatus 200 of FIG. 4 can be utilized in conjunction with any suitable communication network or system, including, but not limited to, a telecommunication network, the Internet, the World Wide Web, an RF signal communications network, a satellite communications network, an optical communications network, a public switched telephone network, a digital communications network, a personal communications services (PCS) communication network, a wireless communication network, and/or any other communication network or system, and/or any combination of same.

In the embodiment of FIG. 4, a user desiring to utilize the apparatus 200, in order to determine if a patent is being infringed, can transmit information regarding the patent to the processing computer 10. The information transmitted to the processing computer 10 can include the patent number and/or the patent text information including the text for the patent claims. The processing computer 10 can receive the patent information, perform any and/or all the pertinent processing routines and/or functionality described herein as being performed by the apparatus 100 in steps 301 through 316 and transmit any and/or all claim chart information and/or claim chart reports to the user communication device 30.

The user communication device 30 can receive, process, and/or store, the information contained in the claim chart information and/or claim chart report(s). The user communication device 30 can also display the information contained in the claim chart and/or claim chart report via the display device 10E and/or output the information contained in the claim chart and/or claim chart report via the output device 10F.

The present invention provides an apparatus and a method for identifying and/or for analyzing potential patent infringement. The present invention can also be utilized to police for and/or to identify products, services, and/or activities, which may give rise to, and/or which may result in, patent infringement. The present invention can also provide an apparatus and method which can be utilized to effectively and efficiently identify and/or evaluate instances of patent infringement and/or instances of potential patent infringement.

While the present invention has been described and illustrated in various preferred and alternate embodiments, such descriptions are merely illustrative of the present invention and are not to be construed to be limitations thereof. In this regard, the present invention encompasses all modifications, variations, and/or alternate embodiments, with the scope of the present invention being limited only by the claims which follow.

What is claimed is:

1. An apparatus for identifying potential patent infringement, comprising:
    an input device for inputting information regarding a patent;
    a processing, device for processing the information regarding the patent, wherein the processing device is configured to:
        identify at least one claim of the patent,
        parse the at least one claim to identity at least one term in the at least one claim,
        formulate a search query comprising the at least one term and a foreign language translation of the at least one term,
        obtain information regarding at least one of a product, products, a service, and services, and
        perform a search of the information regarding at least one of a product, products, a service, and services using the search query; and
    an output device for outputting result of the search;
    wherein the processing device is configured to automatically generate and transmit a natural language question to a chat room and obtain the information regarding at least one of a product, products, a service, and services from the chat room.

2. The apparatus of claim 1, wherein the apparatus is a laptop or notebook computer.

3. The apparatus of claim 1 further comprising:
    a database, wherein the database contains product descriptions.

4. The apparatus of claim 1, further comprising:
    a transmitter for transmitting at least one of an information request to an information source computer and the claim chart information to a user communication device.

5. The apparatus of claim 1, further comprising:
    a receiver for receiving at least one of patent information from a user communication device and a response to a request for information from an information source computer.

6. The apparatus of claim 1, wherein the processing device at least one of processes and parses the text information of the patent in order to identify the claims of the patent.

7. The apparatus of claim 6, wherein the processing device is configured to utilize at least one of a word processing searching technique, a text analysis processing technique, and a semantic analysis processing technique, to identify the claims of the patent.

8. The apparatus of claim 1, wherein the at least one claim comprises an independent claim.

9. The apparatus of claim 8, wherein the processing device is configured to parse the information contained in the independent claim to identify text information corresponding to preamble of the independent claim and to a claim limitation of the independent claim.

10. The apparatus of claim 1, wherein the search query further contains a synonym of the at least one term.

11. The apparatus of claim 1, wherein the at least one term comprises a plurality of terms, and the search query comprises an accuracy constraint requiring presence of a predefined percentage of the terms.

12. The apparatus of claim 1, wherein the processing device is configured to automatically perform the search utilizing a meta search engine.

13. The apparatus of claim 1, wherein the processing device is configured to perform the search on a web site associated with at least one of a manufacturer, a wholesaler, and a retailer, of the at least one of a product, products, a service, and services.

14. The apparatus of claim 1, wherein the processing device is configured to perform the search on at least one of advertising information, marketing information, product review information, services review information, manufacturer information, and distributor information.

15. The apparatus of claim 1, wherein the processing device is configured to generate a claim chart in a plurality of languages.

16. The apparatus of claim 1, wherein the processing device is configured to automatically perform the search on a publication which references the patent.

17. The apparatus of claim 1, wherein the processing device is configured to automatically ascertain at least one of an inventor and an assignee of the patent.

18. The apparatus of claim 1, wherein the at least one of a product, products, a service, and services comprises a first product marked with at least one of a patent number and a patent pending notice.

19. The apparatus of claim 1, wherein the processing device is configured to generate a claim chart of the patent, and the claim chart contains at least one of preamble text information and text information for at least one claim limitation, and further wherein the claim chart contains information regarding whether an identified product or service contains features of at least one of a claim preamble of the patent and a claim limitation of the patent, literally or under the Doctrine of Equivalents.

20. The apparatus of claim 19, wherein the at least one term is at least one of highlighted, underlined, and emboldened in the claim chart.

21. The apparatus of claim 1, wherein the apparatus is programmed for automatic operation.

22. The apparatus of claim 1, wherein the apparatus is utilized in conjunction with an optical communications network.

23. An apparatus for identifying potential patent infringement, comprising:
 an input device for inputting information regarding a patent;
 a processing device for processing the information regarding the patent, wherein the processing device is configured to:
  identify at least one claim of the patent,
  parse the at least one claim to identify at least one term in the at least one claim,
  formulate a search query comprising the at least one term and a foreign language translation of the at least one term,
  obtain information regarding at least one of a product, products, a service, and services, wherein the processing device is configured to automatically generate a natural language question for use in obtaining information from an on-line bulletin board, and
  perform a search of the information regarding at least one of a product, products, a service, and services using the search query; and
 an output device for outputting result of the search.

24. An apparatus for analyzing potential patent infringement, comprising:
 a receiver for receiving information regarding a patent;
 a processing device for processing the information regarding the patent, wherein the processing device is configured to:
  identify at least one claim of the patent,
  parse the at least one claim to identify at least one term in the at least one claim,
  formulate a search query comprising the at least one term and a foreign language translation of the at least one term,
  automatically generate a natural language question for use in obtaining information from an on-line bulletin board;
  generate a claim chart, and
  perform a search of information regarding at least one of a product and a service using the query; and
 a transmitter for transmitting the information contained in the claim chart to a user communication device in order to display the claim chart.

25. The apparatus of claim 24, wherein the apparatus is a server.

26. The apparatus of claim 24, further comprising:
 a database, wherein the database contains product descriptions.

27. The apparatus of claim 24, wherein the processing device at least one of processes and parses the text information of the patent in order to identify the claims of the patent.

28. The apparatus of claim 27, wherein the processing device is configured to utilize at least one of a word processing searching technique, a text analysis processing technique, and a semantic analysis processing technique, to identify the claims of the patent.

29. The apparatus of claim 24, wherein the at least one claim comprises an independent claim.

30. The apparatus of claim 29, wherein the processing device is configured to automatically parse the information contained in the independent claim to identify text information corresponding to preamble of the independent claim and to a claim limitation, of the independent claim.

31. The apparatus of claim 24, wherein the search query farther contains a synonym of the at least one term.

32. The apparatus of claim 24, wherein the at least one term comprises a plurality of terms, and the search query comprises an integrity constraint requiring presence of a predefined percentage of the terms.

33. The apparatus of claim 24, wherein the processing device is configured to perform the search by utilizing a meta search engine.

34. The apparatus of claim 24, wherein the processing device is configured to perform the search on a web site associated with at least one of a manufacturer, a wholesaler, and a retailer of the at least one of a product and a service.

35. The apparatus of claim 24, wherein the processing device is configured to perform the search on at least one of information, marketing information, product review information, services review information, manufacturer information, and distributor information.

36. The apparatus of claim 24, wherein the processing device is configured to generate the claim chart in a plurality of languages.

37. The apparatus of claim 24, wherein the processing device is configured to automatically perform the search on a publication which references the patent.

38. The apparatus of claim 24, wherein the processing device is configured to automatically ascertain at least one of an inventor and an assignee of the patent.

39. The apparatus of claim 24, wherein the at least one of a product and a service comprises a first product marked with at least one of a patent number and a patent pending notice.

40. The apparatus of claim 24, wherein the claim chart contains at least one of preamble text information and text information for at least one claim limitation, and further wherein the claim chart contains information regarding whether an identified product or service contains features of at least one of a claim preamble of the patent and a claim limitation of the patent, literally or under the Doctrine of Equivalents.

41. The apparatus of claim 40, wherein the at least one term is at least one of highlighted, underlined, and emboldened in the claim chart.

42. The apparatus of claim 24, wherein the apparatus is programmed for automatic operation.

43. The apparatus of claim 24, wherein the apparatus is utilized in conjunction with an RF signal communications network.

44. An apparatus for analyzing potential patent infringement, comprising:
- a receiver for receiving information regarding a patent;
- a processing device tot processing the information regarding the patent, wherein the processing device is configured to:
  - identify at least one claim of the patent,
  - parse the at least one claim to identify at least one term in the at least one claim,
  - formulate a search query comprising the at least one term and a foreign language translation of the at least one term,
  - generate a claim chart,
  - automatically generate a natural language question and transmit the natural language question to a chat room and obtain information regarding at least one of a product and a service from the chat room,
  - perform a search of the information regarding at least one of a product and a service using the query; and
- a transmitter for transmitting the information contained in the claim chart to a user communication device in order to display the claim chart.

45. A computer-implemented method for analyzing potential patent infringement, comprising:
- inputting information regarding a patent into a processing device;
- processing the information regarding the patent with the processing device; identifying a claim of the patent;
- parsing the claim to identify at least one term in the claim;
- formulating a search query containing the at least one term and a foreign language translation of the at least one term;
- searching information regarding at last one of a product, products, a service, and services using the query;
- generating claim chart information containing at least some of the information regarding the at least one of a product, products, a service, and services; and
- outputting the claim chart information;
- automatically generating a natural language question for use in obtaining information from a chat room or an on-line bulletin board.

46. The method of claim 45, wherein the method is performed with a laptop or notebook computer.

47. The method of claim 45, wherein, the step of searching comprises:
- searching, a database.

48. The method of claim 45, further comprising:
- transmitting at least one of an information request to an information source computer and the claim chart information to a user communication device.

49. The method of claim 45, further comprising:
- receiving at least one of patent information from a user communication device and a response to a request for information from an information source computer.

50. The method if claim 45, wherein the step of identifying comprises:
- parsing the text information of the patent in order to identify the claims of the patent.

51. The method of claim 50, wherein the method utilizes at least one of a word processing searching technique, a text analysis processing technique, and a semantic analysis processing technique, to identity the claims of the patent.

52. The method of claim 45, wherein the at least one claim is an independent claim.

53. The method of claim 52, further comprising:
- parsing the information contained in the independent claim to identify text information corresponding to claim preamble of the independent claim and to at least one claim limitation of the independent claim.

54. The method of claim 45, wherein the search query further contains a synonym of the at least one term.

55. The method of claim 45, wherein the at least one term comprises a plurality of terms, and the search query comprises an accuracy constraint requiring presence of a predefined percentage of the number of tire terms.

56. The method of claim 45, wherein the step of searching comprises:
- utilizing a meta search engine.

57. The method of claim 45, wherein the step of searching comprises:
- searching a web site associated with at least one of a manufacturer, a wholesaler, and a retailer of the at least one of a product, products, a service, and services.

58. The method of claim 45, wherein the step of searching comprises:
- searching product review information.

59. The method of claim 45, wherein the step of generating claim chart information comprises:
- generating the claim chart information in a plurality of languages.

60. The method of claim 45, wherein the step of searching comprises:
- automatically searching a publication which references the patent.

61. The method of claim 45, further comprising:
- automatically ascertaining at least one of an inventor and an assignee of the patent.

62. The method of claim 45, wherein:
- the information regarding at least one of a product, products, a service, and services is marked with at least one of a patent number and a patent pending notice.

63. The method of claim 45, wherein the claim chart information contains at least one of preamble text information and text information for at least one claim limitation, and further wherein the claim chart information contains information regarding whether an identified product or service contains features of at least one claim limitation, literally or under the Doctrine of Equivalents.

64. The method of claim 63, further comprising:
- causing the at east one term in the claim chart information to be at least one of highlighted, underlined, and emboldened.

65. The method of claim 45, wherein the method is performed automatically.

66. The method of claim 45, wherein the method is performed in conjunction with a wireless communication network.

67. A computer-implemented method for analyzing potential infringement, comprising:
- inputting information regarding a patent into a processing device;
- processing the information regarding the patent with the processing device;
- identifying a claim of the patent;
- parsing the claim to identify at least one term in the claim;
- formulating a search query containing the at least one term and a foreign language translation of the at least one term;
- searching information regarding at least one of a product, products, a service, and services using the query;
- generating claim chart information containing at least some of the information regarding the at least one of a product, products, a service, and services;

outputting the claim chart information;
automatically generating a natural language question;
transmitting the natural language question to a chat room or an on-line bulletin board; and
in response to the question, obtaining the information regarding at least one of a product, products, a service, and services.

68. A computer-implemented method for analyzing potential patent infringement, comprising:
receiving information regarding a patent;
processing the information regarding the patent;
identifying a claim of the patent;
formulating a search query containing terms in the claim and a foreign language translation of at least one of the terms;
searching information regarding at least one of a product, products, a service, and services using the query;
generating claim chart information containing at least some of the information regarding the at least one of a product, products, a service, and services;
transmitting the claim chart information to a user communication device in order to display the claim chart information to a user;
automatically generating a natural language question;
transmitting the natural language question to a chat room or an on-line bulletin board; and
in response to the question, obtaining the information regarding at least one of a product, products, a service, and services.

69. The method of claim 68, wherein the method is performed with a server.

70. The method of claim 68, wherein the step of searching comprises:
searching a database.

71. The method of claim 68, wherein the step of identifying comprises:
parsing the text information of the patent in order to identify the claims of the patent.

72. The method of claim 68, wherein the step of identifying comprises automatically using at least one of a word processing searching technique, a text analysis processing technique, and a semantic analysis processing technique, to identify the claims of the patent.

73. The method of claim 68, wherein the claim is an independent claim.

74. The method of claim 73, further comprising:
parsing the information contained in the independent claim to identify preamble of the independent claim and at least one claim limitation of the independent claim.

75. The method of claim 68, wherein the search query further contains a synonym for the at least one of the terms.

76. The method of claim 68, wherein the search query comprises an accuracy constraint requiring presence of a pre-defined percentage of the number of the terms of the plurality of terms.

77. The method of claim 68, wherein the step of searching comprises:
searching the information regarding at least one of a product, products, a service, and services, by utilizing a meta search engine.

78. The method of claim 68, wherein the step of searching comprises:
searching a web site associated with at least one of a manufacturer, a wholesaler, and a retailer of the at least one of a product, products, a service, and services.

79. The method of claim 68, wherein the step if searching, comprises:
searching at least one of advertising information, marketing information, product review information, services review information, manufacturer information, and distributor information.

80. The method of claim 68, wherein the step of generating claim chart information comprises:
generating the claim chart information in a plurality of languages.

81. The method of claim 68, wherein the step of searching comprises:
automatically searching a publication which references the patent.

82. The method of claim 68, further comprising:
automatically ascertaining at least one of an inventor and an assignee of the patent.

83. The method of claim 68, wherein:
the information regarding at least one of a product, products, a service, and services is marked with at least one of a patent number and a patent pending notice.

84. The method of claim 68, wherein the claim chart information contains at least one of preamble text information and text information for at least one claim limitation, and further wherein the claim chart information contains information regarding whether an identified product or service contains features of at least one claim limitation, literally or under the Doctrine of Equivalents.

85. The method of claim 84, further comprising:
causing the at least one of the terms in the claim chart information to he at least one of highlighted, underlined, and emboldened.

86. The method of claim 68, wherein the method is performed automatically.

87. The method of claim 68, wherein the method is performed in conjunction with a satellite communications network.

88. A computer-implemented method for analyzing potential patent infringement, comprising:
receiving information regarding a patent;
processing the information regarding the patent;
identifying a claim of the patent;
formulating a search query containing terms in the claim and a foreign language translation of at least one of the terms;
searching information regarding at least one of a product, products, a service, and services using the query;
generating claim chart information containing at least some of the information regarding the at least one of a product, products, a service, and services;
transmitting the claim chart information to a user communication device in order to display the claim chart information to a user; and
automatically generating a natural language question for use in obtaining information from a chat room or an online bulletin board.

* * * * *

UNITED STATES PATENT AND TRADEMARK OFFICE
CERTIFICATE OF CORRECTION

| | |
|---|---|
| PATENT NO. | : 7,296,015 B2 |
| APPLICATION NO. | : 10/367228 |
| DATED | : November 13, 2007 |
| INVENTOR(S) | : Alexander I. Poltorak |

It is certified that error appears in the above-identified patent and that said Letters Patent is hereby corrected as shown below:

Column 27, line 54, cancel "processing, device" and replace the cancelled text with --processing device--;

Column 28, line 9, cancel "claim 1 further" and replace the cancelled text with --claim 1, further--;

Column 30, line 19, cancel "limitation," and replace the cancelled text with --limitation--;

Column 30, line 34, cancel "one of" and replace the cancelled text with --one of advertising--;

Column 32, line 8, cancel "tire" and replace the cancelled text with --the--;

Column 34, line 4, cancel "if searching." and replace the cancelled text with --of searching--.

Signed and Sealed this

Twentieth Day of May, 2008

JON W. DUDAS
*Director of the United States Patent and Trademark Office*